United States Patent
Jungck et al.

(10) Patent No.: US 7,210,022 B2
(45) Date of Patent: Apr. 24, 2007

(54) APPARATUS AND METHOD FOR INTERCONNECTING A PROCESSOR TO CO-PROCESSORS USING A SHARED MEMORY AS THE COMMUNICATION INTERFACE

(75) Inventors: Peder J. Jungck, San Jose, CA (US); Andrew T. Nguyen, San Jose, CA (US); Zahid Najam, San Jose, CA (US)

(73) Assignee: Cloudshield technologies, Inc., San Jose, CA (US)

( * ) Notice: Subject to any disclaimer, the term of this patent is extended or adjusted under 35 U.S.C. 154(b) by 459 days.

(21) Appl. No.: 09/858,308

(22) Filed: May 15, 2001

(65) Prior Publication Data

US 2003/0009651 A1 Jan. 9, 2003

(51) Int. Cl.
*G06F 13/00* (2006.01)

(52) U.S. Cl. .................................................. 712/34
(58) Field of Classification Search ............... 712/34, 712/238, 235; 710/21; 709/215, 237, 235, 709/250, 238; 345/503
See application file for complete search history.

(56) References Cited

U.S. PATENT DOCUMENTS

| | | | | |
|---|---|---|---|---|
| 4,692,918 A | | 9/1987 | Elliott et al. | 370/401 |
| 4,744,078 A | * | 5/1988 | Kowalczyk | 370/364 |
| 5,195,181 A | | 3/1993 | Bryant et al. | 709/215 |
| 5,313,586 A | * | 5/1994 | Rutman | 712/34 |
| 5,406,472 A | * | 4/1995 | Simmons et al. | 700/4 |
| 5,566,170 A | | 10/1996 | Bakke et al. | 370/392 |
| 5,784,582 A | | 7/1998 | Hughes | 710/117 |
| 5,805,820 A | | 9/1998 | Bellovin et al. | 395/200.55 |
| 5,822,768 A | * | 10/1998 | Shakkarwar | 711/149 |
| 5,867,704 A | | 2/1999 | Tanaka et al. | 718/105 |
| 5,870,109 A | * | 2/1999 | McCormack et al. | 345/565 |
| 5,938,737 A | | 8/1999 | Smallcomb et al. | 709/247 |
| 5,953,503 A | | 9/1999 | Mitzenmacher et al. | 395/200.33 |
| 5,987,568 A | * | 11/1999 | Adams et al. | 711/118 |
| 5,991,713 A | | 11/1999 | Unger et al. | 704/9 |
| 6,014,660 A | | 1/2000 | Lim et al. | 707/3 |
| 6,016,512 A | | 1/2000 | Huitema | 709/245 |
| 6,046,980 A | | 4/2000 | Packer | 370/230 |
| 6,052,718 A | | 4/2000 | Gifford | 709/219 |
| 6,070,191 A | | 5/2000 | Narendran et al. | 709/226 |

(Continued)

FOREIGN PATENT DOCUMENTS

EP 0 865 180 A2 3/1998 ............ 12/56

(Continued)

OTHER PUBLICATIONS

The Authoritative Dictionary of IEEE Standard Terms, Standards Information Network IEEE Press, 7th Edition, 2000, pp. 725 and 882.*

(Continued)

*Primary Examiner*—Eric Coleman
(74) *Attorney, Agent, or Firm*—James L. Katz; Brinks Hofer Gilson & Lione

(57) ABSTRACT

An apparatus and method for interfacing a processor to one or more co-processors provides a dual ported memory to be used as a message passing buffer between the processor and the co-processors. Both the processor and co-processors can connect asynchronously to the dual ported memory. Control logic monitors activity by the processor to alert the co-processors of communications by the processor written to the memory and otherwise allows the processor and co-processors to think they are interfacing directly with one another.

42 Claims, 16 Drawing Sheets

U.S. PATENT DOCUMENTS

| | | | |
|---|---|---|---|
| 6,073,168 A | 6/2000 | Mighdoll et al. | 709/217 |
| 6,084,878 A | 7/2000 | Crayford et al. | 370/389 |
| 6,108,703 A | 8/2000 | Leighton et al. | 709/226 |
| 6,173,333 B1 * | 1/2001 | Jolitz et al. | 709/240 |
| 6,247,059 B1 | 6/2001 | Johnson et al. | 709/237 |
| 6,289,421 B1 * | 9/2001 | Ali et al. | 711/149 |
| 6,295,599 B1 * | 9/2001 | Hansen et al. | 712/32 |
| 6,317,805 B1 * | 11/2001 | Chilton et al. | 714/800 |
| 6,392,654 B1 * | 5/2002 | Gallotta et al. | 345/503 |
| 6,424,658 B1 | 7/2002 | Mathur | 370/429 |
| 6,438,678 B1 * | 8/2002 | Cashman et al. | 712/34 |
| 6,591,302 B2 * | 7/2003 | Boucher et al. | 709/230 |
| 6,622,185 B1 * | 9/2003 | Johnson et al. | 710/48 |
| 6,662,247 B1 * | 12/2003 | Ales et al. | 710/52 |
| 6,678,801 B1 * | 1/2004 | Greim et al. | 711/148 |
| 6,782,445 B1 * | 8/2004 | Olgiati et al. | 711/100 |
| 2002/0009079 A1 | 1/2002 | Jungck et al. | 370/389 |
| 2002/0065938 A1 | 5/2002 | Jungck et al. | 709/246 |
| 2002/0194291 A1 | 12/2002 | Jungck et al. | 709/213 |

FOREIGN PATENT DOCUMENTS

| | | | |
|---|---|---|---|
| EP | WO 99/09725 | 2/1999 | 29/6 |
| EP | 1061439 A1 * | 12/2000 | |
| WO | WO 98/17039 | 4/1998 | 29/2 |
| WO | WO 99/05584 | 2/1999 | |
| WO | WO 99/27684 | 6/1999 | 12/28 |
| WO | WO 99/60459 | 11/1999 | |
| WO | WO 00/14938 | 3/2000 | |
| WO | WO 00/27092 | 5/2000 | 29/12 |
| WO | WO 00/28713 | 5/2000 | 29/2 |

OTHER PUBLICATIONS

High Performance Memories, Betty Prince, John Wiley & Sons, 1996, pp. 2, 18, 90, and 91.*
John Pescatore, Gartner Analyst, "Commentary: Digging into the DNS foundation," obtained at internet address, http://news.cnet.com/news/0-1005-202-2080091.html, Jun. 15, 2000.
Rainbow Technologies Products, "CryptoSwift eCommerce Accelerator," obtained at internet address, http://isg.rainbow.com/products/cs_1.html, Aug. 5, 2000.
FlowWise Networks, Inc., "AutoRoute™ Automatic Configuration of Layer 3 Routing," www.flowwise.com.
FlowWise, "Router Accelerator—RA 7000 from FlowWise," obtained at internet address http://www.flowise.com/products/ra7000.htm.
Intel® IXP1200 Network Processor, obtained at internet address, http://developer.intel.com/design/network/ixp1200.htm.
Marshall Brain, How Stuff Works, "How Web Servers and the Internet Work," obtained at internet address http://www.howstuffworks.com/web-server.htm.
Marshall Brain, How Stuff Works, "How Domain Name Servers Work," obtained at internet address http://www.howstuffworks.com/dns.htm.
Curt Franklin, How Stuff Works, "How Routers Work," obtained at internet address http://www.howstuffworks.com/router.htm.
Microsoft Corporation, Sep. 1998 "Introduction to TCP/IP," obtained at internet address http://msdn.microsoft.com/library/backgrnd/html/tcpipintro.htm.
Robert Stone, "CenterTrack: An IP Overlay Network for Tracking DoS Floods," Article Oct. 1, 1999, pp. 1-9.
Chapter 1 TCP/IP Fundamentals, obtained at internet address http://webdocs.sequent.com/docs/tcpoac01/ch_1.htm, pp. 1-28.
Cheng Wu, "Web Switching: A New Generation of Networking," pp. 1-3.
ArrowPoint Communications™ Article, "A Comparative Analysis of Web Switching Architectures," pp. 1-11.
ArrowPoint Communications™, Brochure, "The Top 12 Benefits of Content Intelligence."
L. Peter Deutsch, "DEFLATE Compressed Data Format Specification," May 1996.
Antaeus Feldspar, Article, "An Explanation of the Deflate Algorithm," Sep. 11, 1997.
ArrowPoint Communications™ CDDCenter Vendor Listing, "ArrowPoint CS-50 Highlights" obtained at internet address http://www.cddcenter.com/arrowpoint.htm, May 21, 2000.
Peter Christy, Analyst Commentary, "When to Distribute Content—The Peters' Principles," obtained at internet address http://www.cddcenter.com/index.html, May 21, 2000.
Content Delivery 101: An Introduction to Content Distribution & Delivery.
CDDCenter, "How Do Caching and Content Delivery Really Differ?" obtained at internet address http://www.cddcenter.com/cachingvcontent.htm, pp. 1-4, May 21, 2000.
Internet Research Group "Infrastructure Application Service Providers," Feb. 2000, pp. 1-7.
Peter Christy, Internet Research Group, "Content Delivery Architectures: Why Doesn't One Size Fit All?" pp. 1-12.
Steven Vonder Haar, Inter@ctive Week, Feb. 14, 2000, "Content Delivery Shifts To Edge of Net," obtained at internet address http://www.zdnet.com/intweek/stories/news/0,4164,2436865,00.html, Dated May 22, 2000.
David Willis, Network Computing, "The Content-Delivery Edge," obtained at internet address http://www.networkcomputing.com/1103/1103colwillis.html, Dated May 22, 2000.
Phrack Magazine, "IP-spoofing Demystified (Trust-Relationship Exploitation)" vol. Seven, Issue Forty-Eight, File 14 of 18. pp. 1-9, obtained at internet address http://www.fc.net/phrack/files/p48/p48-14.html, Dated Jun. 5, 2000.
Eddie Mission, "What is Eddie?", obtained at internet address http://www.eddieware.org/what.html, Dated Apr. 21, 2000.
Cisco Enterprise Solutions, "Quality of Service," obtained at internet address http://www.cisco.com/warp/public/779/largeent/learn/technologies/qos/.
Cisco White Paper, "Delivering End-to-End Security in Policy-Based Networks," obtained at internet address, http://www.cisco.com/warp/public/cc/pd/nemnsw/cap/tech/deesp_wp.htm.
Technology Packeteer, obtained at internet address, http://www.packeteer.com/technology/index.cfm.
Overview Cisco Content Networking, obtained at internet address http://www.cisco.com/warp/public/cc/so/neso/ienes/cxne/ccnov_ov.htm.
Overview Cisco Secure Policy Manager 2.0, obtained at internet address http://www.cisco.com/warp/public/cc/pd/sqsw/sqppmn/prodlit/secmn_ov.htm.
Alteon Web Systems, White Paper "Optimizing ISP Networks and Services with DNS Redirection," Aug. 1999.
Alteon Web Systems, White Paper "Virtual Matrix Architecture Scaling Web Services for Performance and Capacity," Apr. 2000.
Alteon Web Systems, White Paper, Questions and Answers, pp. 1-3.
3Com Technical Papers, Layer 3 Switching, May 1998.
Web Cache Communication Protocol Version 2, pp. C-1 to C-54.
RFC2267 Working Group- Denial of Service Counter Measures, Tele-conference Meeting May 25, 2000, Moderator, Henry Teng of eBay.
Track-back Architecture General Requirements Version 0.1, Initial Draft submitted to Counter-DoS Solutions Working Group, Jul. 31, 2000, Edited by Bob Geiger, Recourse Technologies.
SwitchOn Networks, Inc., ClassiPI™ At-a-Glance.
C-Port™ A Motorola Company, C-5™ Digital Communications Processor, Product Brief, pp. 1-8, May 4, 2000.
Peder Jungck, "Building a Faster Cache Server" A Theoretical Whitepaper, Silicon Valley Internet Capital, pp. 1-19.
IXF1002 Dual Port Gigabit Ethernet MAC, Product Brief, Level One™ an Intel Company.
NetLogic Microsystems Product Overview.
Agere, Inc. "The Challenge for Next Generation Network Processors", Sep. 10, 1999.
Phillips Semiconductors' VMS747 Security Processor Overview.
Cisco Systems, Cisco 12000 Series GSR, "Performing Internet Routing and Switching at Gigabit Speeds," obtained at internet address, http://www.cisco.com/warp/public/cc/pd/rt/12000/.

Cisco Systems, "Cisco 10000 Edge Service Router," obtained at internet address, http://www.cisco.com/warp/public/cc/pd/rt/10000/.

Nortel Networks™ "Passport 8600 Routing Switch," obtained at internet address, http://www.nortelnetworks.com/products/01/passport/8600/index.html.

Lucent Technologies, "InterNetworking Systems," obtained at internet address, http://www.lucent.com/ins/products/grf/.

Lucent Technologies, "InterNetworking Systems," obtained at internet address, http://www.lucent.com/ins/products/grf/grf1600.html.

Juniper Networks, "M20 Internet Backbone Router," Datasheet, obtained at internet address, http://www.juniper.net/products/dsheet/100009.html.

Juniper Networks, "M40 Internet Backgbone Router," Datasheet, obtained at internet address, http://www.juniper.net/products/dsheet/100001.html.

Juniper Networks, Inc., "M160 Internet Backbone Router" Datasheet, obtained at internet address, http://www.juniper.net/products/dsheet/10012.

Rajeev Kumar, Intel Confidential, "IXP1200 Overview".

Intel "IXP1200 Network Processor," Datasheet, pp. 1-109 (out of 146 pages), May 2000.

Phillips Semiconductors—I2C-bus, News and Events, obtained at internet address, http://www.semiconductors.philips.comi2c/, Jul. 28, 2001.

Comnet Booth #4421 "VHB Technologies Introduces Breakthrough Appliance for High-Bandwidth Networks at Comnet" News Release, Jan. 29, 2001, VHB Technologies, Inc., Richardson, Texas.

VHB Technologies, Inc. presents "The VIPRE™ NPU."

VHB Technologies News & Views, "Pioneering Gigabit-Speed Content-Intelligent Appliances".

VHB Technologies, A Security Technology Paper, Defending Against Denial-of-Service Attacks with the . . . VHB-2000 Network Security Appliance.

Netlogic Microsystems™ Product Brief, obtained at internet address, http://www.netlogicmicro.com/html/datasheets/nse3128.html, pp. 1-2, May 11, 2001.

Switch On Networks, Inc. "ClassiPI" Content Co-Processor, general content and features brochure, pp. 1-5.

C-Port, "C-5™ Digital Communications Processor" Product Brief, pp. 1-8, © 1999-2000 C-Port Corporation, May 4, 2000.

NetLogic Microsystems™ "Policy Co-Processor™" applications and features sheet, p. 1.

NetLogic Microsystems™ "CIDR Co-Processor™" applications and features sheet, p. 1.

NetLogic Microsystems™ "IPCAM® Ternary CAM" application and features sheets, pp. 1-2.

NetLogic Microsystems™ "SynCAM® Binary CAM" application and features sheet, p. 1.

NetLogic Microsystems™ "NCAM Binary CAM" application and features sheet, p. 1.

NetLogic Microsystems™ product overview, pp. 1-2.

Level One™ an Intel Company "IXF1002 Dual Port Gigabit Ethernet MAC," product brief, pp. 1-2, Copyright © 2000 Level One Communications, Inc.

Agere, Inc., Agere White Paper, "Building Next Generation Network Processors," Sep. 10, 1999, pp. 1-8.

Eric J. Rothfus, Agere, Inc., Agere White Paper, "The Case for A Classification Language," Sep. 10, 1999, pp. 1-7.

Web Cache Communication Protocol Version 2, Appendix C, Cisco Cache Engine User Guide, Version 2.0.0, pp. C1-C54.

CloudShield Technologies, Inc., White Paper, "Security at Optical Speed," pp. 1-10, Jan. 21, 2001.

NetLogic Microsystems™ Product Brief "NSE3128 Network Search Engine," obtained at internet address http://209.10.226.214/html/datasheets/nse3128.html pp. 1-2, May 11, 2001.

Listing of Well Known Port Numbers assigned by the Internet Assigned Numbers Authority, obtained at the internet address, http://www.iana.org/assignments/port-numbers pp. 1-55, Aug. 5, 2000.

PM2329 PMC-Sierra, "ClassiPI™ Network Classification Processor," Overview and Features sheet pp. 1-2, 2001 Copyright PMC-Sierra, Inc. Jan. 2001.

* cited by examiner

Test Port

APPARATUS AND METHOD FOR INTERCONNECTING A PROCESSOR TO CO-PROCESSORS USING A SHARED MEMORY AS THE COMMUNICATION INTERFACE

RELATED APPLICATIONS

The following co-pending and commonly assigned U.S. patent applications have been filed on the same date as the present application. These applications relate to and further describe other aspects of the embodiments disclosed in the present application and are herein incorporated by reference:

U.S. patent application Ser. No.09/858,309, "EDGE ADAPTER APPARATUS AND METHOD", filed herewith now U.S. Pat. No. 7,032,031 ;

U.S. patent application Ser. No. 09/858,323, "EDGE ADAPTER ARCHITECTURE APPARATUS ANT) METHOD", filed herewith now U.S. Pat. No. 7,144,008;

U.S. patent application Ser. No. 09/858,324, "APPARATUS AND METHOD FOR INTERFACING WITH A HIGH SPEED BI-DIRECTIONAL NETWORK", filed herewith now U.S. Pat. No. 7,082,502.

REFERENCE TO APPENDIX

An appendix A is included at the end of this document containing exemplary processor to co-processor instruction formats according to one embodiment.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Computer networks, in general, interconnect multiple computer systems for the purpose of sharing information and facilitating communications. Computer networks include private networks which interconnect computers within a particular enterprise, such as an intranet, and public networks, which interconnect one or more of the computers of enterprises, public institutions and/or private individuals. One exemplary public network is the Internet. The Internet is a packet switched network which utilizes the Transport Control Protocol/Internet Protocol ("TCP/IP") suite to communicate data.

Networking computers together generally increases efficiency and reduces wasted resources. These advantages are spurring significant growth in the number of computers/user being connected by networks and the volume of data they are exchanging. This growth is, in turn, spurring advances in network technologies to handle the increased demand being placed on these network infrastructures.

This is evident on the Internet where each day more and more users connect to the Internet adding to the millions of existing users already communicating and exchanging data via this public infrastructure. Further, new applications for the network, such as streaming video, telephony services, real time interactive content, instant messaging, and peer to peer communications continue to be developed in addition to the exponential growth in the user of traditional network applications, such as the world wide web and electronic mail. This growth is placing an incredible strain on the Internet infrastructure that causes network traffic to slow and hardware to overload. In particular, some of these new applications for the network are dependent upon the quality of service ("QoS") of the network and cannot tolerate arbitrary reductions in throughput. For example, traffic interruptions in a voice telephony application may result in garbled or delayed communications which may not be tolerable to the users of such an application.

A way to solve these resultant network traffic jams is to increase the speed of the network and increase its bandwidth. Another solution is to retrofit the existing infrastructure to use new technologies, such as optical fiber interconnections, which substantially increases network throughput and bandwidth.

Unfortunately, a network, and in particular the Internet, is not simply a collection of interconnections. Other devices, such as routers, switches, hubs, and cache servers, form an integral part of the network infrastructure and play important roles in its performance. Upgrading the interconnections of the network without also upgrading the hardware which makes all of those interconnections function, will only serve to move the bottlenecks but not eliminate them. Further, hardware devices, which seek to enhance the network, such as content delivery devices or security devices, must similarly be upgraded so as not to degrade any overall enhancements to the network infrastructure.

While network technologies continue to advance, some of these technologies advance at a quicker pace than others. Where these technologies interface, it is often necessary to adapt the slower evolving technology to keep up with the faster evolving technology. In such a case, advances in optical networking technologies are far exceeding advances in the technologies to enhance the communications being carried by the network.

In particular, many network enhancement applications, such as security applications or content delivery applications, require the interception and processing of data from the network in order to perform their function. By default then, these devices become a choke point through which all the data of the network must pass. Therefore, this interception and processing device needs to operate at or beyond the wire speed, i.e. the operating throughput of the network, or the device becomes a bottle neck. In most cases, where the device cannot keep pace with the network, any benefits of the application will be outweighed by the degradation caused in network throughput. Unfortunately, optical networking technologies are increasing wire speeds beyond the current capabilities of packet processing technology.

Accordingly, there is a need for a way to cost effectively adapt existing packet processing technologies so as not to degrade network performance.

SUMMARY

The present invention is defined by the following claims, and nothing in this section should be taken as a limitation on those claims. By way of introduction, the preferred embodiments described below relate to an interface for coupling a processor to a co-processor. The interface includes a memory coupled with the processor and the co-processor, the memory having at least two read/write interfaces for reading and writing data to the memory and control logic coupled with the at least two read/write interfaces. Wherein the processor writes data intended for the co-processor to the memory and reads data from the co-processor from the memory, the co-processor writes data intended for the processor to the memory and reads data from the processor from the memory, the control logic operative to facilitate the reading of the written data by the processor and the co-processor.

The preferred embodiments further relate to a method of interfacing a processor with a co-processor. In one embodiment, the method includes receiving first data from the processor on a first interface, storing the first data in a memory, signaling the co-processor that the first data has been received, receiving a read command on a second interface from the co-processor, providing the first data to the co-processor via the second interface, receiving second data from the co-processor on the second interface, storing the second data in the memory, signaling the processor that the second data has been received, receiving a read command on the first interface from the processor, and providing the second data to the processor via the first interface.

Further aspects and advantages of the invention are discussed below in conjunction with the preferred embodiments.

DETAILED DESCRIPTION OF THE PRESENTLY PREFERRED EMBODIMENTS

Meeting the universal demand for an Internet that is more robust, that is capable of sustaining its own growth and that can adapt to new technologies, requires the migration of the current network infrastructure to next generation networking technologies. This next generation data network is often referred to as the "Optical Internet."

The shift to the Optical Internet has created a new set of challenges. Chief among these challenges is the need to manage an exponentially higher volume of network traffic at much higher rates of speed. In the U.S., the principal standard for optical networks is the American National Standards Institute ("ANSI") standard for synchronous data transmission over optical media known as Synchronous Optical Network ("SONET"). The SONET standard actually comprises multiple standards for transmission rates up to 9.953 gigabits per second ("Gbps") with the capability to go up to 20 Gbps. Each transmission rate standard is known as an Optical Carrier Level ("OC-X"). Exemplary optical carrier levels include OC-12 for communications at 622.08 Mbps, OC-48 for communications at 2.488 Gbps and OC-192 for communications at 10 Gbps. Today's microprocessors face a situation where they cannot support the pace of performance increases associated with the deployment of fiber-based network bandwidth of OC-48 and higher. Simply put, the move to fiber-optic networks has pushed the physical limits of microprocessors and the I/O bus beyond their current technical capabilities. The platform described herein is designed to address many issues associated with Optical Internet services that cannot be addressed by the current software based firewall servers.

Figure 1:
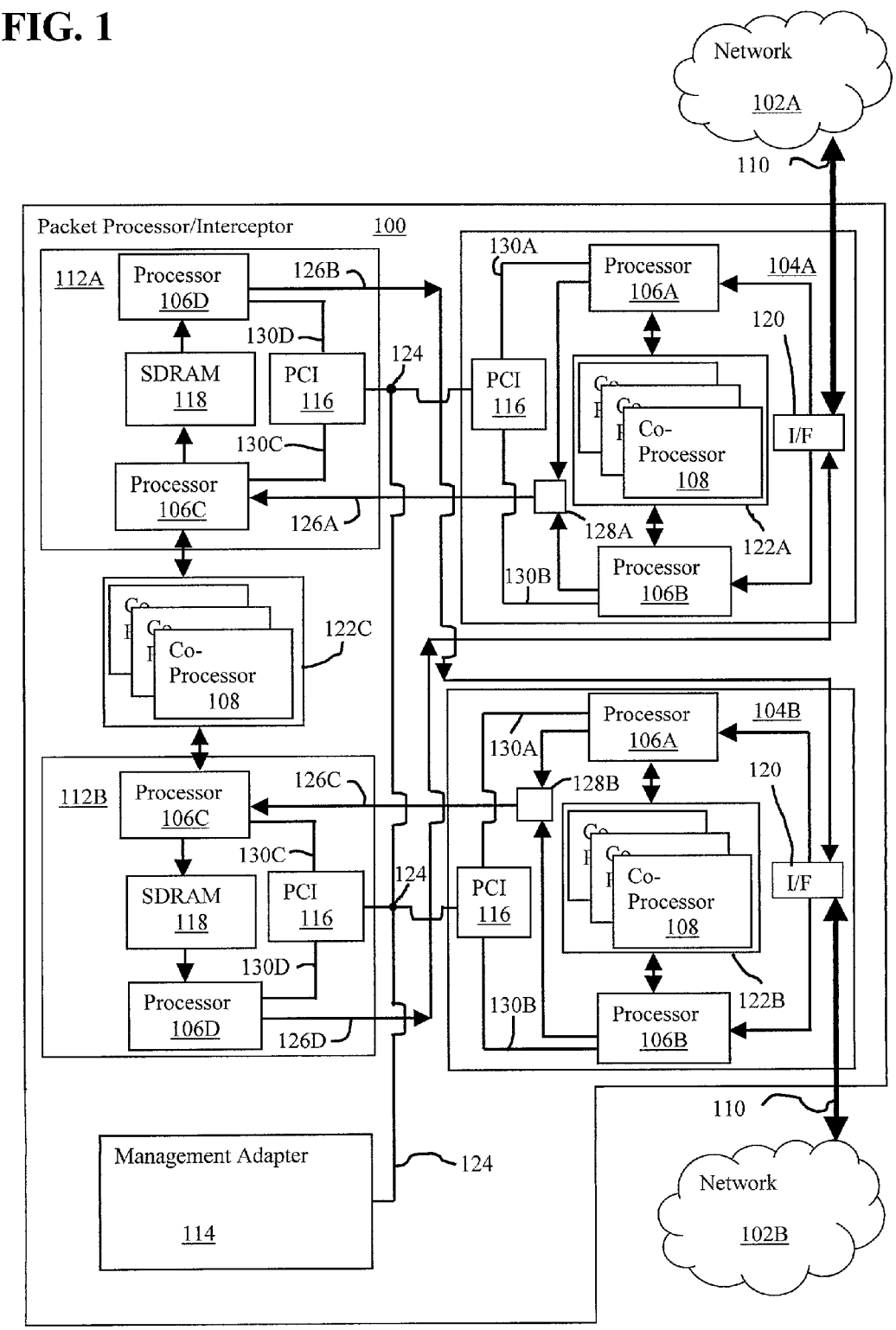
FIG. 1 depicts a block diagram of an exemplary packet interceptor/processing device.

FIG. 1 shows an exemplary device 100 for intercepting and processing packets at wire speed from an optical based network 102, such as the Internet, compatible with the OC-48 standard or faster. For a more detailed explanation of the operation of devices which intercept and process packets, refer to U.S. Patent Application entitled "EDGE ADAPTER APPARATUS AND METHOD" and U.S. Patent Application Serial entitled "EDGE ADAPTER ARCHITECTURE APPARATUS AND METHOD", both of which are captioned above. The exemplary device 100 may include the Rapid Intelligent Processing Platform manufactured by Cloudshield Technologies, Inc., located in San Jose, Calif. For clarity, some components of the device 100 are not shown.

The device 100 shown in FIG. 1 is coupled with the network 102 (consisting of an upstream network portion 102A and a downstream network portion 102B) via a network connection 110 so as to be able to intercept and process packets communicated between the upstream network portion 102A and the downstream network portion 102B of the network 102. Herein, the phrase "coupled with" is defined to mean directly connected to or indirectly connected through one or more intermediate components. Such intermediate components may include both hardware and software based components. In one embodiment, the network connection 110 is an optical network connection. In an alternate embodiment, the network connection 110 is an electrical network connection.

In one embodiment, not shown in the figure, the device 100 is configured as a rack-mount system comprising a chassis which provides power, cooling and a housing for the other components, as described below. The housing further includes a backplane into which the other components plug into and which interconnects those components. Such components may include interface components to couple external devices to add additional processing functionality.

The device 100 includes two primary processing elements 104A, 104B which intercept and process packets from the network 102. One primary processing element 104A is coupled with the upstream network 102A and the other primary processing element 104B is coupled with the downstream portion of the network 102B. It will be appreciated that additional primary processing elements 104A, 104B may be provided depending on the topology, physical and logical arrangement of the network 102 and the coupling point of the device 100. Further, the functionality of the processing elements 104A, 104B may be consolidated into a single processing element. In one embodiment, each primary processing element 104A, 104B includes a printed circuit board capable of being plugged into the backplane described above.

The primary function of the primary processing elements 104A, 104B is to perform stateless processing tasks on the incoming packet stream. Stateless processing tasks are tasks that do not require knowledge of what has come before in the packet stream. Stateless tasks include ingress and egress filtering. Ingress and egress filtering involves ensuring that packets arriving from a particular portion of the network actually came from that portion of the network. For example, where the device 100 is programmed with the range of network addresses in the portion of the network 102B downstream of the device 100, packets arriving from that downstream portion with a network address out of range would be detected as invalid and filtered out of the packet stream, or vice versa for the upstream portion of the network 102A. Egress filtering refers to filtering in the upstream to downstream direction and ingress filtering refers to filtering in the downstream to upstream direction. For the filtering function, the filter values are typically maintained in block lists. Note that while filtering is a stateless function, independent of what packets have come before, the device 100 interjects stateful processing, as described below, to dynamically update the filtering or other information required for the stateless processing tasks. While the network processor 106A, 106B on the primary processing elements 104A, 104B can store state information about historical packet activity, each processing element 104A, 104B only sees one direction of the packet flow off the network 102. Therefore, they cannot perform true stateful processing tasks which requires bi-directional visibility. This functionality is provided by the secondary processing elements 112A, 112B, described in more detail below.

The device 100 further includes two secondary processing elements 112A, 112B which are coupled with the primary processing elements 104A, 104B via a command/control bus 124 and packet busses 126A, 126B, 126C, 126D. In one embodiment, each secondary processing element 112A, 112B includes a printed circuit board capable of being plugged into the backplane described above. Additional secondary processing elements 112A, 112B may be included or the functionality of the secondary processing elements 112A, 112B may be consolidated into a single secondary processing element. In one embodiment, the command/control bus 124 is a bus routed over the interconnecting backplane of device 100 and complying with the Compact Personal Computer Interface ("cPCI") standard and is 64 bits wide and operates at a frequency of at least 33 MHz. Exemplary packet busses 126A, 126B, 126C, 126D include busses complying with the IX bus protocol of the Intel IXP1200 Network Processing Unit and are described in more detail below. Each exemplary packet bus 126A, 126B, 126C, 126D may be bi-directional, 64 bits wide and operate at a frequency of at least 84 MHz and may be routed over the backplane described above. Alternatively, other bus technologies/protocols may be used and are dependent upon the implementation of the device 100. The command/control bus 124 carries command and control information between the primary and secondary processing elements 104A, 104B, 112A, 112B. The packet busses 126A, 126B, 126C, 126D carry packet data between the primary and secondary processing elements 104A, 104B, 112A, 112B.

The primary function of the secondary processing elements 112A, 112B is to perform stateful processing tasks, i.e. tasks which are dependent on historical activity. One example of a stateful processing task involves network security applications which require monitoring conversations, i.e. bi-directional packet flow, in the packet stream, typically consisting of requests and responses to those requests. Stateful processing and the ability to monitor traffic bi-directionally allows the secondary processing elements watch for requests and responses and match them up. The arrangement of the inbound network processors 106C of the secondary processing elements 112A, 112B, described in more detail below, allows them to share information about packets coming from either direction, i.e. upstream or downstream. Further, the secondary processing elements 112A, 112B can affect the stateless processing of the primary processing elements 104A, 104B. For example, where the secondary processing elements 112A, 112B determine that packets from a certain network address are consistently invalid, the secondary processing elements 112A, 112B can add that network address to the filtering list of the primary processing elements 104A, 104B thereby dynamically updating the stateless processing environment.

For example, packets such as those traversing between a web browser and web server change port numbers once a session between the two entities is created. A stateless rule cannot be applied that says "don't allow HTTP POST commands from network address ABC" without destroying all communications from the network address ABC. To accomplish the desired filtering and not destroy all communications from the source network address, the device 100 watches for new sessions directed to the web server on port 80 (standard HTTP application port). By watching the traffic, an example session might choose to then communicate on port 23899 at the web server. Only by subsequently watching traffic destined to this new port would the device 100 be able to search for HTTP POST commands that need to be blocked. Once identified, the packets could then be dealt with. If the session startup was not monitored and information not stored for future reference, i.e. not storing state information, an HTTP POST command traversing the network as part of a text stream from a different application, such as a document about how to configure a blocking system, might be falsely identified. Stateful inspection generally requires visibility to traffic in both directions. In the case above, a packet from the client to the server would have shown the request for a new web session. The response from the server to the client would have shown the web server port number to monitor. In firewalls it is also this response that subsequently allows that port number to have future traffic allowed through the firewall. This second port number on the server is the one for which traffic can be subsequently monitored for the HTTP POST. By storing relevant information for future packet processing analysis, the device 100 is made stateful.

In addition, the device 100 includes a management adapter 114 which is coupled with the command/control bus 124. The management adapter 114 is used to manage the device 100 and control the functionality of the primary and secondary processing elements 104A, 104B, 112A, 112B. In one embodiment, the management adapter 114 includes a computer server having dual-Pentium III processors manufactured by Intel Corporation, located in Santa Clara, Calif., or suitable alternatives. The management adapter 114 further includes at least 64 MB of RAM and at least 10 GB of hard disk storage. The management adapter 114 is preferably implemented as a single board computer that plugs into the back plane, as described above, although more than one board as well as a stand alone personal computer may also be used. The management adapter 114 further includes an external management interface (not shown) which allows the connection of an external management device (not shown) for programming, controlling and maintaining the device 100. In one embodiment, the external management interface includes a model 82550 100 megabit Ethernet Interface manufactured by Intel Corporation, located in Santa Clara, Calif. Other interfaces, such as serial, parallel, coaxial and optical based interfaces may also be used. In one embodiment, the external management device is a desktop computer such as the Deskpro Model ENS SFF P733 manufactured by Compaq Computer Corporation, located in Houston, Tex. Alternatively, any suitable Pentium™ class computer having suitable memory and hard disk space in addition to Ethernet or other form of network connectivity, may be used. Further, the external management device may be located locally with respect to the device 100 or remotely and connected to the device 100 via a local or wide area network.

The primary processing elements 104A, 104B are preferably capable of operating in parallel. The two primary processing elements 104A, 104B, are also referred to as Media Adapter Cards ("MAC") or Media Blade Adapters ("MBA"). Each primary processing element 104A, 104B includes a network interface 120, two network processors 106A, 106B, a set 122A, 122B of one or more co-processors 108, a packet bus interface 128A, 128B, and a command/control bus interface 116. The network interface 120 is coupled with the network 102 via the network connection 110. In one embodiment, the network connection 110 is an optical network connection operating at a throughput of approximately 2.5 Gbps and a 1, 4 or 16 bit width. Each network processor 106A, 106B is coupled with the network interface 120, in a parallel configuration, to receive packets from the network 102. It will be appreciated that the disclosed embodiments can support any number of network processors 106A, 106B operating in parallel as described below, as the application demands. Further, each secondary processing element 112A, 112B is also coupled with network interface 120 of one of the primary processing elements 104A, 104B to transmit packets onto the network 102, described in more detail below. In addition, each network processor 106A, 106B is coupled with a set 122A, 122B of one or more co-processors 108 which is described in more detail below. Further, each network processor 106A, 106B is coupled with the command/control bus 124 via command/control interface busses 130A, 130B and the command/control bus interface 116. In one embodiment, the command/control interface busses 130A, 130B are compliant with the Personal Computer Interface ("PCI") standard and are 32 bits wide and operate at a frequency of at least 33 MHz. Further, the command/control bus interface 116 is a PCI to cPCI bus bridge for interfacing the busses 130A, 130B with the command/control cPCI bus 124, described above. Both network processors 106A, 106B are also coupled with one of the secondary processing elements 112A, 112B via the packet bus interface 128A, 128B and the packet bus 126A, 126B.

Each secondary processing element 112A, 112B also includes two network processors 106C, 106D, in a serial configuration, and a command/control bus interface 116. It will be appreciated that the disclosed embodiments can support any number of network processors 106A, 106B operating serially as described below, as the application demands. Each of the network processors 106C, 106D is coupled with the command/control bus 124 via the command/control interface busses 130C, 130D and the command/control bus interface 116. In one embodiment, the command/control interfaces are at least 33 MHz 32 bit PCI compliant as described above and the command/control bus interface 116 is a PCI-to-cPCI bus bridge as described above. One of the network processors 106C is coupled with both network processors 106A, 106B of one of the primary processing elements 104A, 104B via the packet bus 126A, 126C and the packet bus interface 128A, 128B for receiving packet data from the primary processing elements 104A, 104B. The other of the network processors 106D is coupled with the network interface 120 of the other of the primary processing elements 104A, 104B via the packet bus 126B, 126D for sending packet data to the network 102. The secondary processing elements 112A, 112B are also referred to as Intelligent Packet Adapters ("IPA").

Each secondary processing element 112A, 112B further includes a shared synchronous dynamic RAM ("SDRAM") memory fabric 118 coupled between each of the network processors 106C, 106D to allow the network processors 106C, 106D to operate uni-directionally and move data from the inbound network processor 106C to the outbound network processor 106D. For more detail on the operation of this memory fabric 118, refer to U.S. patent application entitled "APPARATUS AND METHOD FOR INTERFACING WITH A HIGH SPEED BI-DIRECTIONAL NETWORK", captioned above.

In addition, one of the network processors 106C, from each secondary processing element 112A, 112B is coupled with a set 122C of co-processors 108. It will be appreciated that the embodiments disclosed below relating to the sharing of co-processors 108 sets 122A, 122B between the two network processors 106A, 106B of the primary processing element 104A, 104B are applicable to the arrangement of the co-processors 108 and the secondary processing elements 112A, 112B. In one embodiment of the secondary processing elements 112A, 112B, the network processors 106C which are sharing the co-processors 108 of set 122C are located on two different circuit boards (one for each element 112A, 112B) which share a common daughter card containing the set 122C of co-processors 108.

Figure 3:
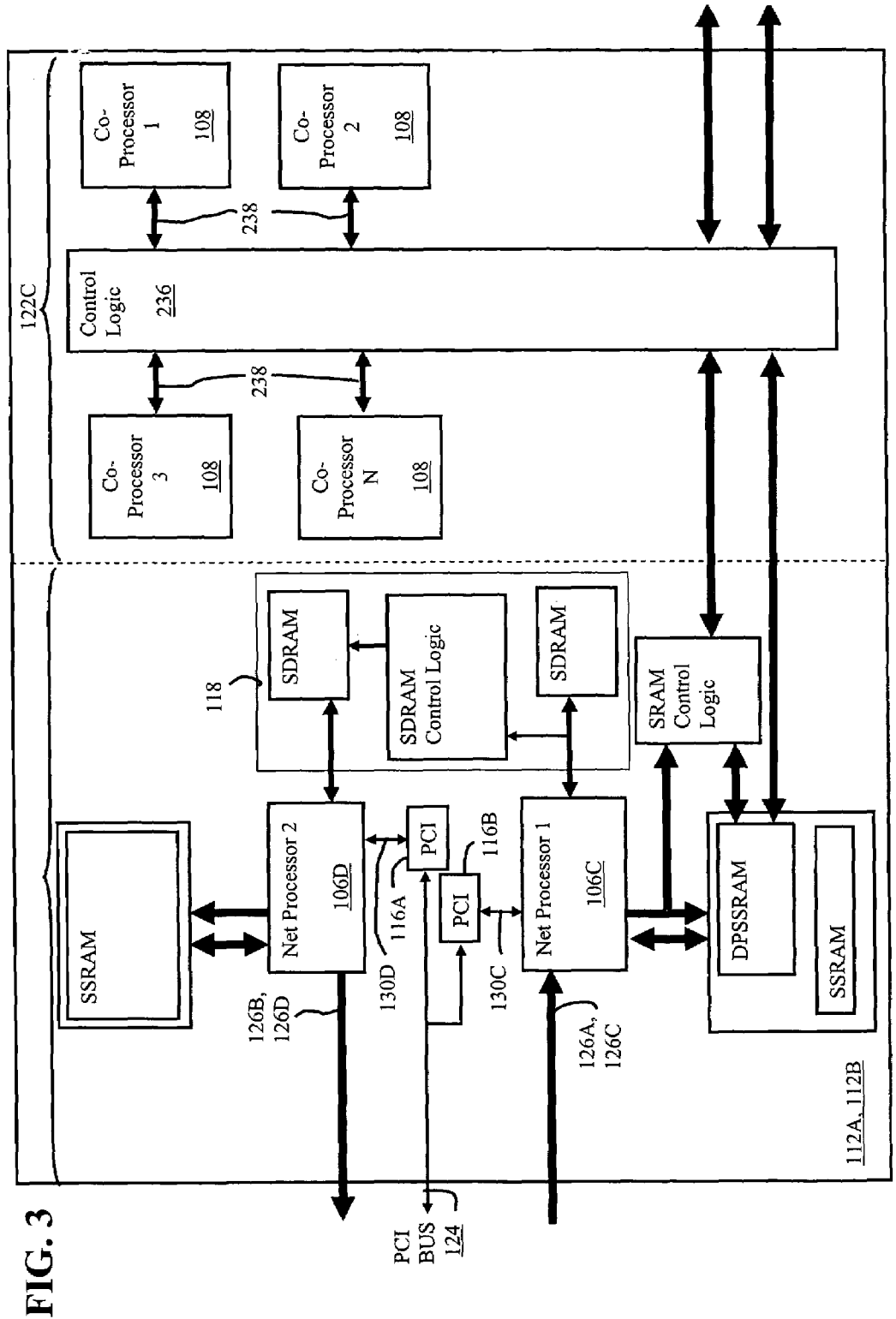
FIG. 3 depicts a block diagram of an exemplary secondary processing element coupled with a set of co-processors.

Each network processor 106C, 106D handles one direction of the bi-directional packet flow coming to/from the secondary processing elements 112A, 112B. In particular, the inbound network processor 106C handles traffic incoming to the secondary processing element 112A, 112B and performs inspection and analysis tasks. The outbound network processor 106D handles outgoing traffic from the secondary processing element 112A, 112B and performing actions on the packet such as modification, cleansing/deletion or insertion of new or replacement packets. By serializing the network processors 106C, 106D on the secondary processing elements 112A, 112B, the processing of packets can be divided into steps and distributed between the two network processors 106C, 106D. It will be appreciated more network processors 106C, 106D may be coupled serially to enhance the ability to sub-divide the processing task, lowering the burden on any one network processor 106C, 106D only at the cost of the latency added to the packet stream by the additional network processors 106C, 106D and the additional hardware cost. The network processors 106C, 106D intercommunicate and share data via an SDRAM memory fabric to implement this serial packet flow. For more detailed information, refer to U.S. Patent Application entitled "APPARATUS AND METHOD FOR INTERFACING WITH A HIGH SPEED BI-DIRECTIONAL NETWORK", captioned above. Further each secondary processing element 112A, 112B handles a different direction of packet flow from the network 102. In particular, the upstream secondary processing element 112A handles packets flowing from the network 102A upstream of the device 100 to the network 102B downstream of the device 100. The downstream secondary processing element 112B handles packets flowing from the network 102B downstream of the device 100 to the network 102A upstream of the device 100. FIG. 3 shows a block diagram of an exemplary secondary processing element 112A, 112B coupled with a set 122C of co-processors 108. For a more detailed description of this figure, please refer to U.S. Patent Application entitled "APPARATUS AND METHOD FOR INTERFACING WITH A HIGH SPEED BI-DIRECTIONAL NETWORK", captioned above.

The device 100 intercepts and processes packets from the network 102. One "upstream" primary processing element 104A intercepts packets arriving from the network 102A upstream of the device 100 and the other "downstream" primary processing element 104B intercepts packets arriving from the network 102B downstream of the device 100. The intercepted packets are pre-processed, as described above, and then passed on to a corresponding secondary processing element 112A, 112B for subsequent processing and possible release back to the network 102. Further, within each primary processing element 104A, 104B, the network interface 120 converts the protocol, frequency and bus width of the network connection 110 to the protocol, frequency an bus width of the network processors 106A, 106B and splits the incoming packet stream among the two network processors 106A, 106B which process packets in parallel (explained in more detail below). In one embodiment, the packet stream is alternated between the network processors 106A, 106B in a "ping-pong" fashion, i.e. a first packet going to one network processor 106A, 106B, the second packet going to the other network processor 106A, 106B and the next packet going back to the first network processor 106A, 106B, and so on. For more detail on this parallel packet processing architecture, refer to U.S. Patent Application entitled "EDGE ADAPTER ARCHITECTURE APPARATUS AND METHOD", captioned above. The network processors 106A, 106B are further coupled with the packet bus interface 128A, 128B which couples both network processors 106A, 106B with the common packet bus 126A, 126C to the secondary processing elements 112A, 112B.

For example, a packet traveling from the network 102A upstream of the device 100 to the network 102B downstream of the device 100 is intercepted by the network interface 120 of the upstream primary processing element 104A. The network interface 120 passes the intercepted packet to one of the network processors 106A, 106B which preliminarily process the packet as described above. This may involve the shared co-processors 108, as described below. The packet is then transmitted to the inbound network processor 106C of the upstream secondary processing element 112A for subsequent processing via the packet bus interface 128A and the packet bus 126A. Within the upstream secondary processing element 112A, the packet is processed and moved from the inbound network processor 106C to the outbound network processor 106D via the SDRAM memory fabric 118. This processing may involve processing by the shared co-processors 122. If it is determined that the packet is to be released, in original or modified form, the outbound network processor 106D sends the packet to the network interface 120 of the downstream primary processing element 104B via the packet bus 126B. The network interface 120 of the downstream primary processing element 104B then transmits the packet back onto the network 102B.

For packets traveling from the network 102B downstream of the device 100 to the network 102A upstream of the device 100, the packets are intercepted by the network interface 120 of the downstream primary processing element 104B. The network interface 120 passes the intercepted packet to one of the network processors 106A, 106B which preliminarily process the packet as described above. This may involve the shared co-processors 108, as described below. The packet is then transmitted to the inbound network processor 106C of the downstream secondary processing element 112B for subsequent processing via the packet bus interface 128B and packet bus 126C. Within the downstream secondary processing element 112B, the packet is processed and moved from the inbound network processor 106C to the outbound network processor 106D via the SDRAM memory fabric 118. This processing may involve processing by the shared co-processors 122. If it is determined that the packet is to be released, in original or modified form, the outbound network processor 106D sends the packet to the network interface 120 of the upstream primary processing element 104A via the packet bus 126D. The network interface 120 of the upstream primary processing element 104A then transmits the packet back onto the network 102A.

Overall, the device 100 intercepts packets flowing in an up or downstream direction, processes them and determines a course of action based on the application that the device 100 is implementing. Such actions include, for example, releasing the packet to the network 102, modifying the packet and releasing it to the network 102, deleting the packet, substituting a different packet for the intercepted packet, forwarding the packet to additional internal or external processing resources (not shown), logging/storing information about the packet, or combinations thereof. Applications include content delivery application or security applications such as for preventing unauthorized network access or preventing denial of service attacks.

The network processor 106A, 106B, 106C, 106D used in the primary and secondary processing elements 104A, 104B, 112A, 112B is preferably a general purpose network processor which is suitable for a wide variety of network applications. In one embodiment, each primary and secondary processing element 104A, 104B, 112A, 112B includes two network processors 106A, 106B, 106C, 106D and supporting hardware (not shown), as described above. An exemplary network processor 106A, 106B, 106C, 106D is the Intel IXP1200 Network Processor Unit, manufactured by Intel Corporation, located in Santa Clara, Calif. For more detailed information about the exemplary processor 106, please refer to Intel® IXP1200 Network Processor Datasheet part no. 278298-007 published by Intel Corporation, located in Santa Clara, Calif. This exemplary network processor 106A, 106B provides six micro-engines/path-processors for performing processing tasks as well as a StrongARM™ control processor. Each of the network processors 106A, 106B, 106C, 106D preferably operates a frequency of 233 MHz or faster, although slower clock speeds may be used. It will be appreciated that other network specific or general purpose processors may be used.

As with most general purpose processors, the network processor 106A, 106B, 106C, 106D is capable of being programmed to perform a wide variety of tasks. Unfortunately, this adaptability typically comes at the price of performance at any one given task. Therefore, to assist with the processing of packets, each network processor 106A, 106B on the primary processing element 104A, 104B and the inbound network processor 106C on the secondary processing element 112A, 112B is coupled with one or more co-processor 108 sets 122A, 122B, 122C. The co-processors 108 on each set 122A, 122B, 122C may be specialized processors which perform a more limited set of tasks, but perform them faster and more efficiently than the network processor 106A, 106B, 106C is capable of. In one embodiment, the co-processors 108 include one or more classification co-processors and one or more content addressable memories ("CAM").

The classification co-processors 108 are used to accelerate certain search and extraction rules for the network processor 106A, 106B, 106C. In one embodiment of device 100, the co-processor 108 set 122A, 122B of each primary processing element 104A, 104B includes two classification co-processors 108. The shared co-processor 108 set 122C also includes two classification co-processors shared by the secondary processing elements 112A, 112B. An exemplary classification co-processor is the PM2329 ClassiPI Network Classification Processor manufactured PMC-Sierra, Inc., located in Burnaby, BC Canada. This co-processor is capable of operating at a frequency of at least 100 MHz.

The CAM co-processors 108 are used to facilitate certain search and compare operations that would otherwise be computationally intensive and degrade the performance of the network processor 106A, 106B, 106C. It is preferable that the CAM co-processors 108 be capable of being cascaded together, from 2 to 8, or more devices, to increase the search range. It is further preferably that the CAM co-processors 108 have the capability of processing at least 100 million compares per second. In such a design, each CAM data bit has an associated local mask bit that is used during the compare operation. In contrast with global mask bits, the local mask bits are used only with the associated bit and only for compare operations. This provides masking on an individual bit basis for ternary operation. In one embodiment of the device 100, the co-processor 108 set 122A, 122B of each primary processing element 104A, 104B includes eight CAM co-processors 108. The shared co-processor 108 set 122C also includes eight CAM co-processors 108 shared by the secondary processing elements 112A, 112B. An exemplary CAM is the NetLogic NSE3128 Network Search Engine, formerly named IPCAM®-3, manufactured by NetLogic Microsystems, Inc., located in New York City, N.Y. For more detailed information about the exemplary CAM, refer to NSE3128 Network Search Engine product brief available at the web site netlogic.com/html/datasheets/nse3128.html, last accessed May 11, 2001.

An exemplary CAM device may have at least the following features:

Organization options of any single device in cascade: 64 K×72, 32 K×144 or 16 K×288;

Local mask bit associated with each CAM;

Clock rates: 50/66/100 MHz for 1 megabit devices or up to 200 MHz for a 9 megabit device;

Eight global mask registers;

16 bit instruction bus;

32 bit result bus;

36/72 bit comparand bi-directional bus or 72/144 bit comparand bus for a 9 megabit device;

flags to indicate Match ("/M"), Multiple Match ("/MM") and Full Flag ("/FF"); and 24 bit Next Free Address ("NFA") bus.

It will be appreciated that other classification processors and CAM's may be used and that additional task specific co-processors may also be used, such as cryptographic co-processors, to enhance the processing capability of the primary or secondary processing elements 104A, 104B, 112A, 112B.

As was discussed, the device 100 has to be able to operate at wire speed or faster so as not to degrade network throughput. In the case of an OC-48 class network, this means handling communications speeds of nearly 2.5 Gbps in both directions through the device 100, i.e. simultaneously to achieve full duplex functionality, for a total of nearly 5 Gbps throughput for the device 100. Ideally, to achieve this goal, the co-processors 108 should be directly connected to the network processors 106A, 106B, 106C. This would achieve the highest bandwidth of data exchange between these devices, maximizing their utilization and efficiency. Unfortunately, physical, electrical and device design limitations make this direct connection difficult to achieve.

With regard to the primary processing elements 104A, 104B, the physical limitations primarily include the limited amount of space/area available on a single circuit board. It is difficult and expensive to implement two network processors 106A, 106B, their supporting hardware and up to ten co-processors 108, or more, as well as all of the routing interconnections on a single circuit board. An alternative is to move some of the devices to daughter card circuit boards which plug into a main circuit board. This would increase the available area for part placement but introduces electrical concerns regarding the interfaces between the devices. In particular, a daughter card arrangement introduces a board-to-board connector between the daughter card and the main circuit board. This connector introduces undesirable electrical characteristics into the interface between devices mounted on the daughter card and devices mounted on the main circuit board. These undesirable characteristics include increased noise, lower limits on operating frequency, increased parasitic capacitance, increased resistance and increased inductance. These characteristics limit the speed with which these devices can communicate. In order to properly interface across the connector, careful modeling is required to predict the electrical behavior of the connector and how it will impact the interface.

Further, complexities related to interfacing the network processors 106A, 106B to the co-processors 108 also complicate the design and implementation of the device 100. In particular, both the network processor 106A, 106B and the co-processors 108 provide input/output busses for the purpose of interconnecting that device with other devices. However, the network processor 106A, 106B as well as the different types of co-processors 108, all have different interface requirements, such as different supported clock frequencies, bus widths and communications protocols. In addition, the interfaces are further complicated by the desire to connect more than one of each type of co-processor 108 with the network processor 106A, 106B. Even further complicating the interface requirements is the desire to allow each network processor 106A, 106B on the processing element 104 to share the same co-processors 108 and allow each inbound network processor 106C to share the same co-processor 108 set 122C. Sharing co-processor 108 sets 122A, 122B, 122C allows the network processors 106A, 106B, 106C to interoperate and share data, such as state information, in addition to saving costs by reducing the number of devices on the primary processing elements 104A, 104B. When one network processor 106A, 106B, 106C decides to store state information, that information is made available to the other network processor 106A, 106B, 106C. Further, when global updates to the data stored within the co-processors 108 are needed, such as updates to the CAM tables, these updates can be performed more efficiently since there are fewer co-processor sets 122A, 122B, 122C to update. For example, when the secondary processing elements 112A, 112B, due to the result of some stateful processing task, need to update the state information in the CAM data, such as the filtering block lists, the updates need to go to fewer devices resulting in a faster and more efficient distribution of those updates. Further, the sharing of state information among the network processors 106A, 106B on the primary processing elements 104A, 104B, allows the network processors 106A, 106B to operate in parallel and thereby reduces the traffic flow to each network processor 106A, 106B, achieving a longer number of clock cycles over which a packet may be processed.

Note that the following operational and physical description of the primary processing element's 104A, 104B network processor 106A, 106B connection to the co-processor 108 sets 122A, 122B is applicable also to the sharing of co-processors by the inbound co-processors 106C of the secondary processing element 112A, 112B. The only difference is that the two network processors 106C which are sharing the co-processor 108 set 122C are not located on the same board requiring a different interfacing scheme. In one embodiment, the daughter card is sandwiched between the two secondary processing elements 112A, 112B with each connecting to an opposing side of the daughter card.

Figure 2:
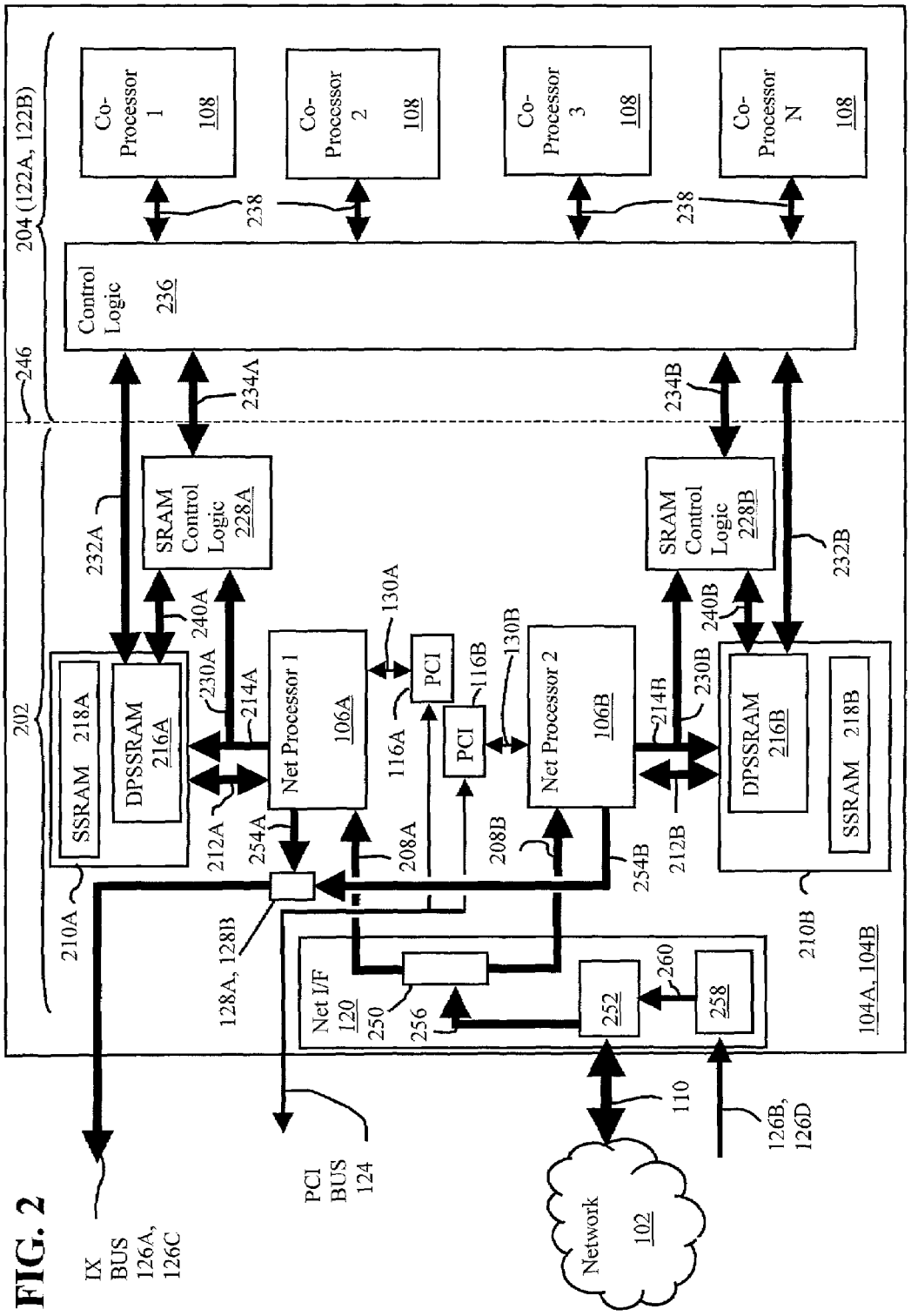
FIG. 2 depicts a block diagram of an exemplary primary processing element for the device of FIG. 1 according to a first embodiment.

FIG. 2 shows block diagram of a primary processing element 104A, 104B for a packet interceptor/processor device 100 according to a first embodiment. The primary processing element 104A, 104B includes a main circuit board 202 and a daughter card 204. The main circuit board 202 includes a network interface 120 which interfaces the primary processing element 104A, 104B to the network 102 via the network connection 110 and is further coupled with two network processors 106A, 106B via input busses 208A, 208B.

Figure 16:
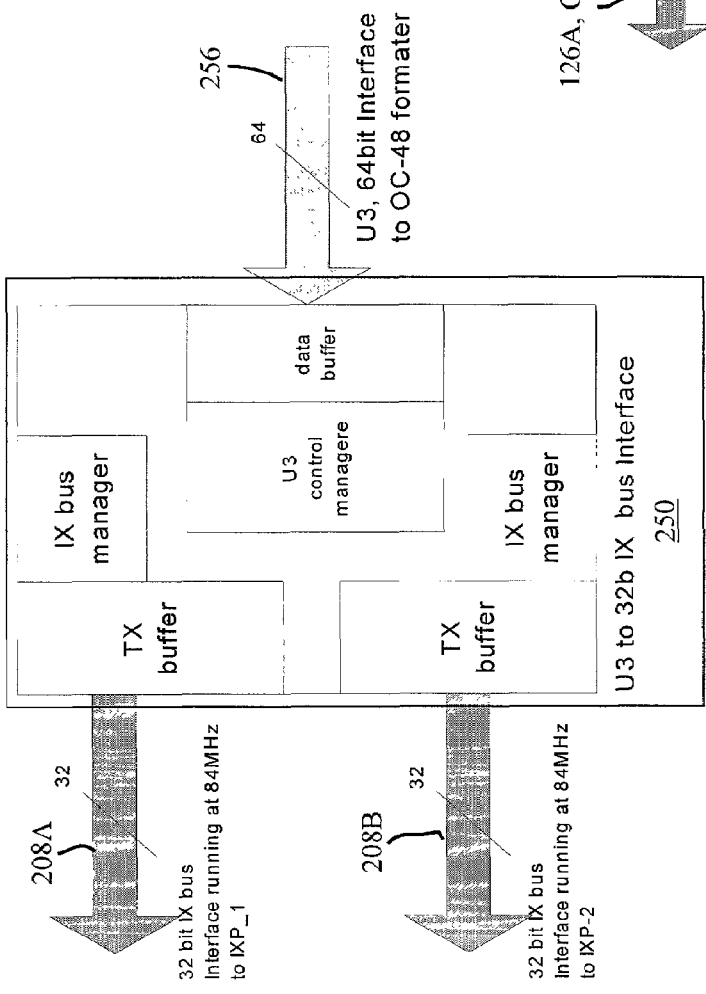
FIG. 16 depicts a more detailed diagram of the network transceiver of FIG. 2.

In one embodiment, the network interface 120 includes an optical network interface capable of interfacing the primary processing element 104A, 104B to a network 102 connection 110 complying with the OC-48 SONET specification. In an alternate embodiment, the network interface 120 includes a gigabit Ethernet interface for interfacing the primary processing element 104A, 104B to a network 102 connection 110 complying with a gigabit Ethernet specification. The network interface 120 includes a network transceiver 252 and a packet distributor 250. The network transceiver 252 interfaces to the network 102 via the network connection 110 and translates the data protocols of the network 102 into the constituent packets that make up the data stream. In one embodiment, the network transceiver is a Utopia IXF6048 OC-48 Cell/Packet Framer, manufactured by Intel Corporation, located in Santa Clara, Calif. Alternatively, other network transceivers 252 may be used and may depend on the type of network 102 being connected. The network transceiver 252 sends the translated packets to the packet distributor 250 via the transceiver bus 256. In one embodiment, the transceiver bus 256 is 64 bits wide and operates at a frequency of at least 66 MHz and complies with the Packet over SONET ("POS")-UTOPIA level 3 protocol. The packet distributor 250 receives the packets from the network transceiver 252 and distributes them to the network processors 106A, 106B via input busses 208A, 208B. The input busses 208A, 208B are each 32 bits wide and operate at a frequency of at least 84 MHz, complying with the IX bus protocol and operating in a master/slave unidirectional configuration. The packet distributor 250 converts between the transceiver bus 256 protocol, bit width and frequency and the input bus 208A, 208B protocol, bit width and frequency and distributes the incoming packets in an alternating, ping-pong, fashion to the network processors 106A, 106B, as described above. In one embodiment, the packet distributor 250 includes a field programmable gate array ("FPGA"). FIG. 16 shows a detailed diagram of an exemplary packet distributor 250. Alternatively, the packet distributor 250 may include a GD16523/CDR De-multiplexer and a GD16524 multiplexer fiber optic interface, manufactured by Intel Corporation, located in Santa Clara and Calif.

In addition, the network interface 120 further includes an outbound packet bus interface 258 which interfaces the packet bus 126B, 126C from the secondary processing elements 112A, 112B to the network transceiver 252 for receiving packets and transmitting them back on to the network 102. The packet busses 126B, 126C from the secondary processing elements 112A, 112B are 64 bits wide and operate at a frequency of at least 84 MHz, as described above. The outbound packet bus interface 258 converts the 84 MHz bus speed to 66 MHz and outputs the received packets to network transceiver 252 over a 66 MHz 64 bit wide bus 260. It will be appreciated that the bus widths and operating frequencies are implementation dependent and that any suitable bus width or operating frequency may be used.

Figure 17:
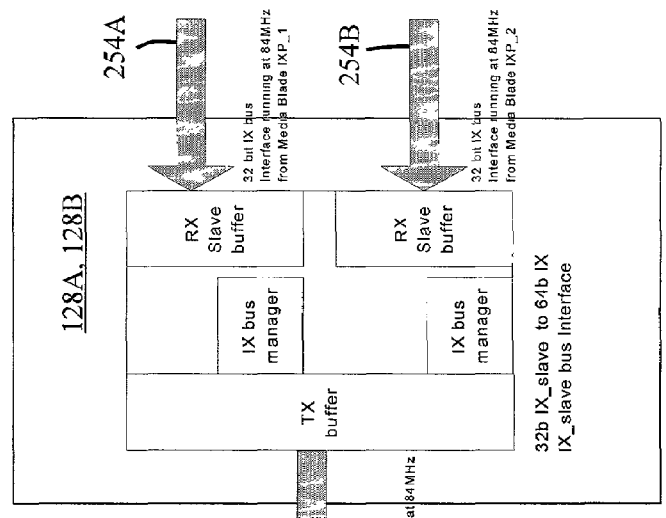
FIG. 17 depicts a more detailed diagram of the packet bus interface of FIG. 1.

Each network processor 106A, 106B is also coupled to the packet bus 126A, 126C via the output busses 254A, 254B and the packet bus interface 128A, 128B for transmitting packet data to the corresponding secondary processing element 112A, 1112B. The output busses 254A, 254B are each 32 bits wide and operate at 84 MHz, complying with the IX bus protocol and operating in a master/slave unidirectional configuration. The packet bus interface 128A, 128B couples the two 32 bit busses from the network processors 106A, 106B with the packet bus 126A, 126C. The packet bus 126A, 126C is 64 bits wide and operates at a frequency of at least 84 MHz and complies with IX bus protocol operating in a bi-directional configuration, as described above. The packet bus interface 128A, 128B converts between the 32 and 64 bit bus widths. In one embodiment, the packet bus interface is implemented as an field programmable gate array ("FPGA"). FIG. 17 shows a detailed diagram of an exemplary packet bus interface 128A, 128B.

In one embodiment, the network processors 106A, 106B are Intel IXP1200 network processors, described above, which provide a 64 bit IX bus interface configurable as two 32 bit unidirectional interfaces. The input busses 208A, 208B are coupled with one half (32 bits) of the IX bus interface of each network processor 106A, 106B. The output busses 254A, 254B are coupled with the other half (32 bits)

of the IX bus interface of each network processor 106A, 106B. It will be appreciated that the input/output interfaces and bus protocols are processor architecture dependent and vary among manufacturers.

As described above, the packet busses 126A, 126B, 126C, 126D also use the IX bus of the network processors 106A, 106B.

Each network processor 106A, 106B is coupled with a command/control bus interface 116A, 116B via command/control interface busses 130A, 130B which interfaces the network processors 106A, 106B to the command/control bus 124. In one embodiment, the command/control interface busses 130A, 130B are 32 bit wide PCI compliant busses operating at 33 MHz. The command/control bus interfaces 116A, 116B comprise PCI to cPCI bridge interfaces 116A, 116B which interfaces the network processor 106A, 106B to a cPCI bus 124. The cPCI bus 124 interconnects the primary processing element 104A, 104B with other processing elements 104 and other resources (not shown) of the device 100 allowing the sharing of data and distribution of packet processing, as described above. The PCI to cPCI bridge interface 116A, 116B includes model I21154, manufactured by Intel Corporation, located in Santa Clara, Calif. Alternatively, other bus architectures may be used for communication among the components of the device 100.

Each network processor 106A, 106B, is further coupled with a bank 210A, 210B of sync burst static random access memory ("SSRAM") via an SSRAM data interface 212A, 212B and an SSRAM address interface 214A, 214B provided by the network processor 106A, 106B. In one embodiment, the SSRAM data and address interfaces 212A, 212B, 214A, 214B are 32 bits wide and operate at a frequency of at least 100 MHz. Each bank 210A, 210B of SSRAM includes a block 218A, 218B of one or more single port SSRAM devices and a block 216A, 216B of one or more dual port SSRAM ("DPSSRAM") devices. The combined blocks 216A, 218A and 216B, 218B for each network processor 106A, 106B are configured as a contiguous address space to the network processor 106A, 106B, described in more detail below. In one embodiment, the single port SSRAM devices include MT48LC32M8A2FC-75, manufactured by Micron Technologies, Inc, located in Boise, Id. and the dual port DPSSRAM devices include 16 K×36 synchronous pipelined dual port SRAM's IDT70V3569, manufactured by IDT, Inc., located in Santa Clara, Calif. It will be appreciated that other types of memory devices and other memory architectures, supporting dual asynchronous interfaces in the case of the DPSSRAM, may be used, such as dynamic ram or synchronous dynamic ram. The network processors 106A, 106B are coupled with one of the two ports of their respective DPSSRAM blocks 216A, 216B.

Each network processor 106A, 106B is further coupled with SRAM control logic 228A, 228B, also known as the address decode filter ("ADF") FPGA, via the SRAM control logic address interface 230A, 230B. Each SRAM control logic 228A, 228B (ADF) 228A, 228B is coupled with and snoops/listens in on the SRAM control logic address interface 230A, 230B of the corresponding DPSSRAM block 216A, 216B and captures any transmitted address if it falls into the co-processors 108 operational command/data address range. Thus the SRAM control logic 228A, 228B filters the address from the network processors 106C and 106D by SRAM control logic address interface 230A, 230B and on a match for a co-processor operation by the network processor, 106C, 106D, the address sent by network processor, 106C, 106D to the SSRAM 210A, 210B is captured and placed in an internal first in first out ("FIFO") queue of the SRAM control logic 228A, 228B which is than passed to daughter card control logic 236.

The DPSSRAM blocks 216A, 216B are also coupled with the daughter card 204 via the DPSSRAM daughter card interfaces 232A, 232B. In one embodiment, the DPSSRAM daughter card interface 232A, 232B are each at least 64 bits wide and operate at a frequency of at least 50 MHz. The SRAM control logic 228A, 228B. 328 is coupled with the daughter card 204 via SRAM control logic daughter card interfaces 234A, 234B. In one embodiment, the SRAM control logic 228A, 228B, 328 is a custom designed device using a CMOS Programmable Logic Device ("CPLD"). Operation of the SRAM control logic 228A, 228, 328 is described in more detail below.

The primary processing element 104A, 104B further includes a daughter card connector 246 for connecting an auxiliary printed circuit board, also known as a daughter card, 204 to the main circuit board 202 of the primary processing element 104A, 104B. In one embodiment, the daughter card connector 246 includes two 140 pin high density connectors, one to interface each network processor 106A, 106B. An exemplary high density connector is the QStrip QTE/QSE series connector from Samtec, Inc. located in New Albany, Ind. Alternatively, other connector interfaces and protocols may be used. An exemplary configuration for the connector 246 is (MB=main circuit board 202, CC=daughter card 204):

| SYMBOL | Direction | DESCRIPTION |
| --- | --- | --- |
| GND | MB to CC | Ground |
| RST# | MB to CC | Chip reset. |
| MCLK | MB to CC | Chip Master clock. |
| DP_A(1) | CC to MB | Dual-Port SRAM address. |
| DP_A(2) | CC to MB | Dual-Port SRAM address. |
| DP_A(3) | CC to MB | Dual-Port SRAM address. |
| DP_A(4) | CC to MB | Dual-Port SRAM address. |
| DP_A(5) | CC to MB | Dual-Port SRAM address. |
| DP_A(6) | CC to MB | Dual-Port SRAM address. |
| DP_A(7) | CC to MB | Dual-Port SRAM address. |
| DP_A(8) | CC to MB | Dual-Port SRAM address. |
| DP_A(9) | CC to MB | Dual-Port SRAM address. |
| DP_A(10) | CC to MB | Dual-Port SRAM address. |
| DP_A(11) | CC to MB | Dual-Port SRAM address. |
| DP_A(12) | CC to MB | Dual-Port SRAM address. |
| DP_A(13) | CC to MB | Dual-Port SRAM address. |
| DP_A(14) | CC to MB | Dual-Port SRAM address. |
| DP_WE# | CC to MB | Dual-Port SRAM write enable. |
| DP_CE# | CC to MB | Dual-Port SRAM chip enable. |
| DP_CLK | CC to MB | Dual-Port SRAM clock. |
| DP_D(63:0) | Bi-direction | Dual-Port SRAM data. |
| AFC_D(63:0) | MB to CC | Address Filter Chip data. |
| AFC_RD# | CC to MB | Address Filter Chip read enable. |
| AFC_CLK | CC to MB | Address Filter Chip read clock. |
| AFC_FFSEL | CC to MB | Address Filter Chip FIFO select.0: CAM FIFO1: Classify FIFO |
| AFC_FF# | MB to CC | Address Filter Chip Full Flag. |
| AFC_EF# | MB to CC | Address Filter Chip Empty Flag. |
| TCK | MB to CC | Boundary-scan Test-Access-Port clock. |
| TMS | MB to CC | Boundary-scan Test-Access-Port mode select. |
| TDI | MB to CC | Boundary-scan Test-Access-Port input data. |
| TDO | MB to CC | Boundary-scan Test-Access-Port output data. |
| CPGM# | MB to CC | Configuration Programming. |
| CINIT# | MB to CC | Configuration Init. |
| CCLK | MB to CC | Configuration Clock. |
| CDIN | MB to CC | Configuration data input to CC FPGA. |
| CDONE | CC to MB | Configuration done. |

The daughter card 204 includes daughter card control logic 236 and the co-processor 108 set 122A, 122B. In one embodiment, the co-processor 108 set 122A, 122B includes two classification co-processors and eight content addressable memories ("CAM") cascaded to supply CAM and classification banks. The daughter card control logic 236 interfaces with the DPSSRAM daughter card interfaces 232A, 232B and the SRAM control logic daughter card interfaces 234A, 234B. The daughter card control logic 236 is further coupled with each of the co-processors 108 via co-processor interfaces 238. Each co-processor may further be coupled with each other in a cascaded fashion via a inter-co-processor interface bus (not shown). It will be appreciated that other components located on the main circuit board 202 can be moved to the daughter card 204 and vice versa depending on the implementation of the processing element 104 and the desired performance requirements.

In one embodiment, both network processors 106A, 106B share the same set 122A, 122B of co-processors 108. The daughter card control logic 236 interfaces all of the co-processors 108 to the network processors 106A, 106B as will be described below. Alternatively, each network processor 106A, 106B may have its own set 122A, 122B of co-processors 108. For example, the primary processing element 104A, 104B may include two daughter cards 204, one for each network processor 106A, 106B. In the case of the secondary processing elements 112A, 112B, each may have its own daughter card including the set 122C of co-processors.

Figure 4:
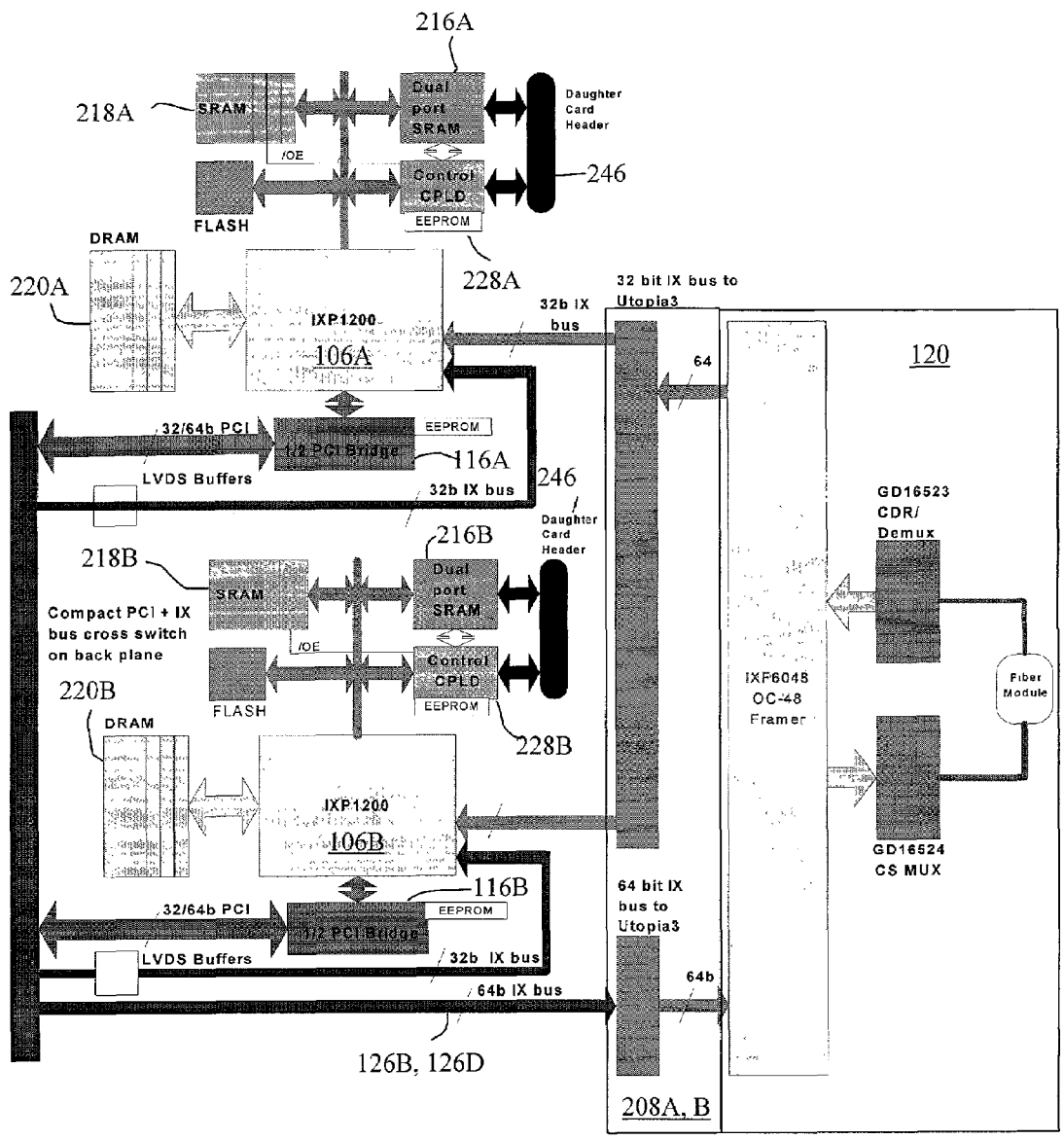
FIG. 4 depicts a more detailed schematic diagram of the primary processing element of FIG. 2.
Figure 5:
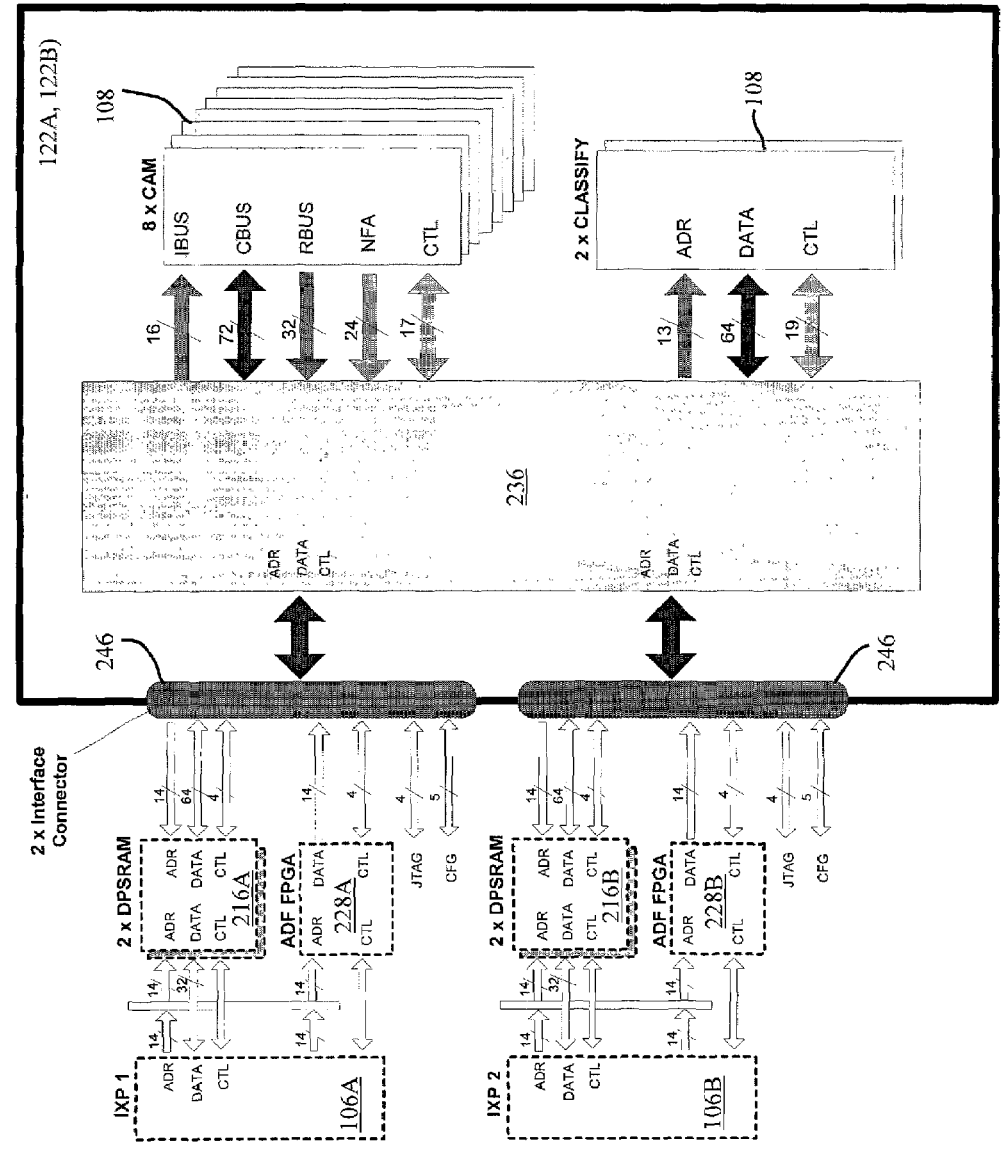
FIG. 5 depicts a more detailed schematic diagram of the interconnection of the two network processors of the primary processing element of FIG. 2 with the co-processor daughter card.

FIG. 4 shows a more detailed schematic diagram of the primary processing element 104A, 104B. FIG. 5 shows a more detailed schematic diagram of the interconnections of one of the network processors 106A, 106B with the daughter card control logic 236.

Figure 6:
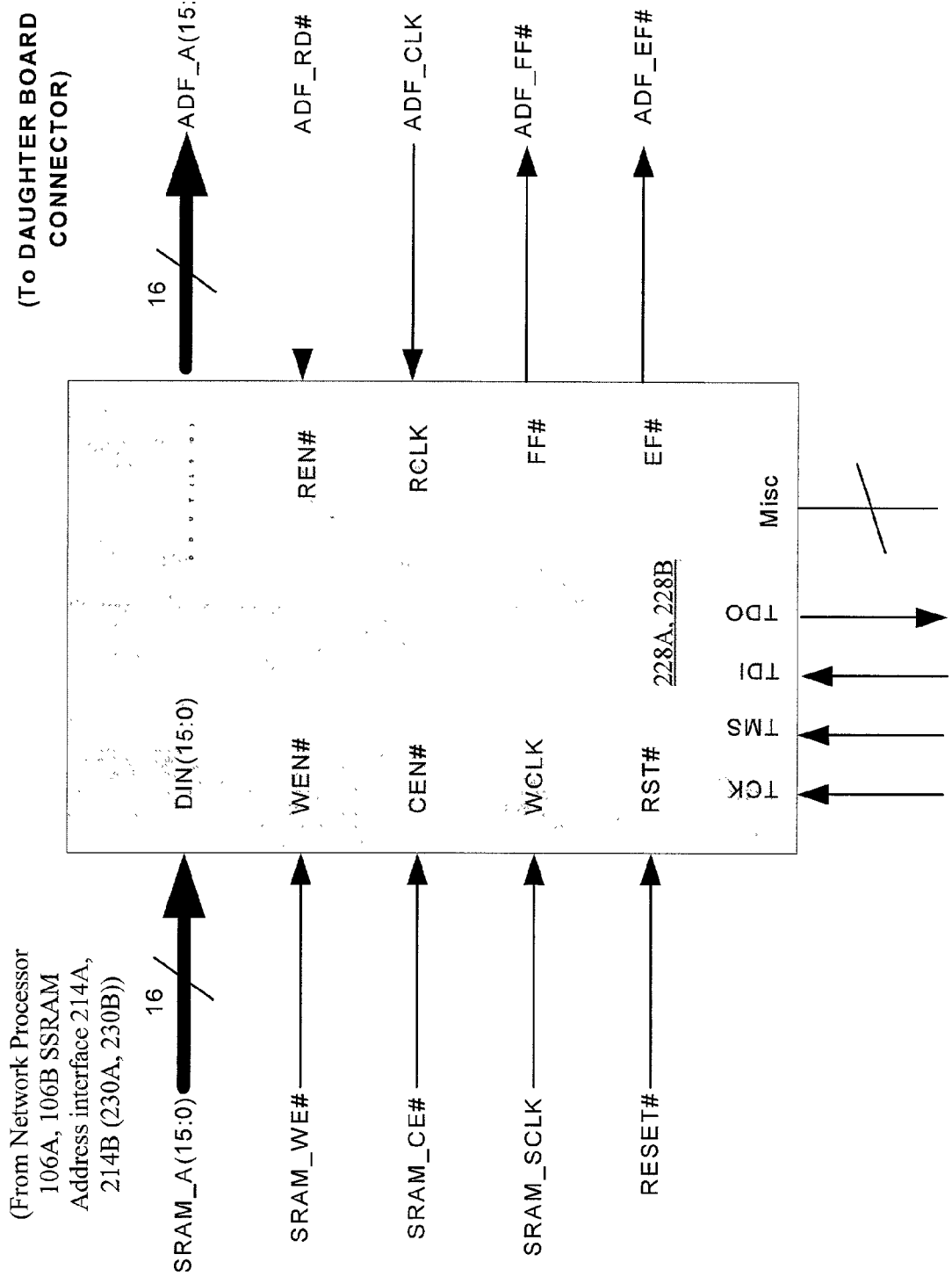
FIG. 6 depicts a more detailed diagram of the interfaces of the SRAM control logic.

FIG. 6 shows a more detailed diagram of the interfaces of the SRAM control logic 228A, 228B. The following table explains the signal names used in FIG. 6:

| SYMBOL | I/O | DESCRIPTION |
|---|---|---|
| RST# | I | Chip reset. |
| FFSEL | I | FIFO select.0: CAM FIFO1: Classify FIFO |
| DIN(15:0) | I | FIFO data inputs. Connect the IXP's SRAM interface A(14:1) to DIN(13:0). Pin DIN(15:14) are spare. |
| WEN# | I | FIFO write enable. Indicates the IXP is writing to the Dual Port SRAM. |
| CEN# | I | FIFO chip enable. Indicates the IXP is accessing the Dual Port SRAM. |
| WCLK | I | FIFO write clock. Connect to the IXP SCLK, which is 1/2 the rate of the IXP core clock. |
| DOUT(15:0) | O | FIFO data outputs. Correlates to the address that the processor is writing to the Dual Port SRAM. Only bits DOUT(13:0) are defined. The DOUT(15:14) are spare. |
| REN# | I | FIFO read enable. Asserted by the CAM/Classify FPGA. |
| RCLK | I | FIFO read clock. Generated by the CAM/Classify FPGA. |
| FF# | O | FIFO full flag. |
| EF# | O | FIFO empty flag. |
| GCK0, GCK1, GCK2, GCK3 | I | Clock inputs for Global Clock Buffers. |
| M0, M1, M2 | I | Mode pins. Specify the configuration mode. |
| CCLK | I/O | Configuration clock I/O pin. Input for SelectRAM and slave-serial modes. Output in master-slave mode. |
| PROGRAM# | I | Asserted low to initiate a configuration sequence. |
| DONE | I/O | Indicates that the configuration loading is complete, and that the start-up sequence is in progress. The output may be open drain. |
| INIT# | I/O | Open-drain. Output Low to indicate that the configuration memory is being cleared. The pin becomes user I/O after configuration. |
| DOUT/BUSY | O | Configuration data output pin. The pin becomes user I/O after configuration. |
| DIN/D0, D1, D2, D3, D4, D5, D6, D7 | I | Configuration data input pin. The pin becomes user I/O after configuration. |
| WRITE# | I | Configuration pin for Slave Parallel mode. |
| CS# | I | Configuration pin for Slave Parallel mode. |
| TDI, TMS, TCK | I | Boundary-scan Test-Access-Port input pin. |
| TDO | O | Boundary-scan Test-Access-Port output pin. |
| VCCO | I | Power supply pin for output drivers. |
| VCCINT | I | Power supply pin for internal core logic. |
| GND | I | Ground |
| VREF | I | Input threshold voltage pin. |
| PWDN# | I | Logic high for normal operation. Logic low for power down mode. |
| STATUS | O | Logic low when the part is in power down mode. Logic high when the part is ready to resume normal operation. |

Figure 7:
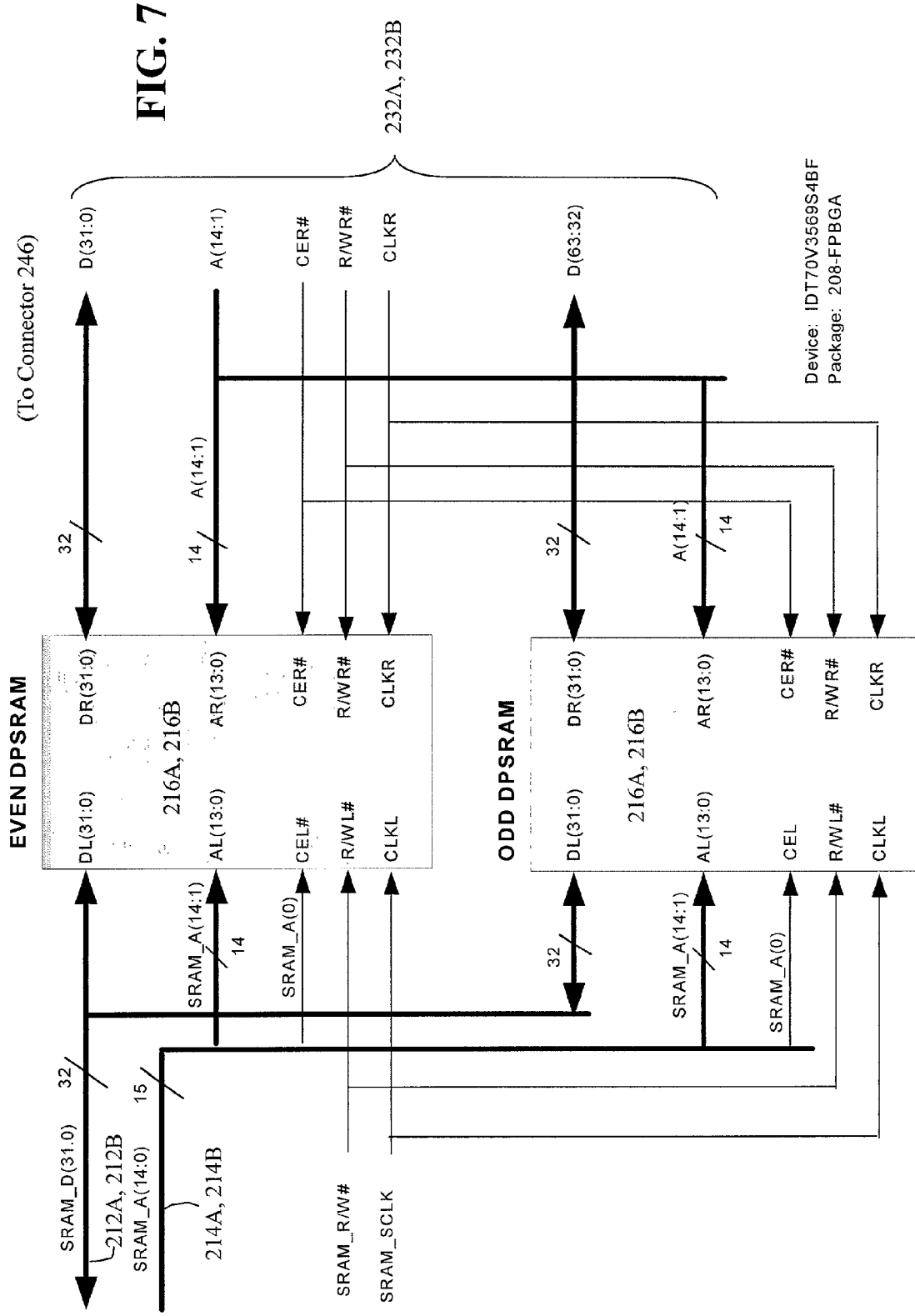
FIG. 7 depicts a more detailed diagram of the interfaces to the DPSSRAM.
Figure 8:
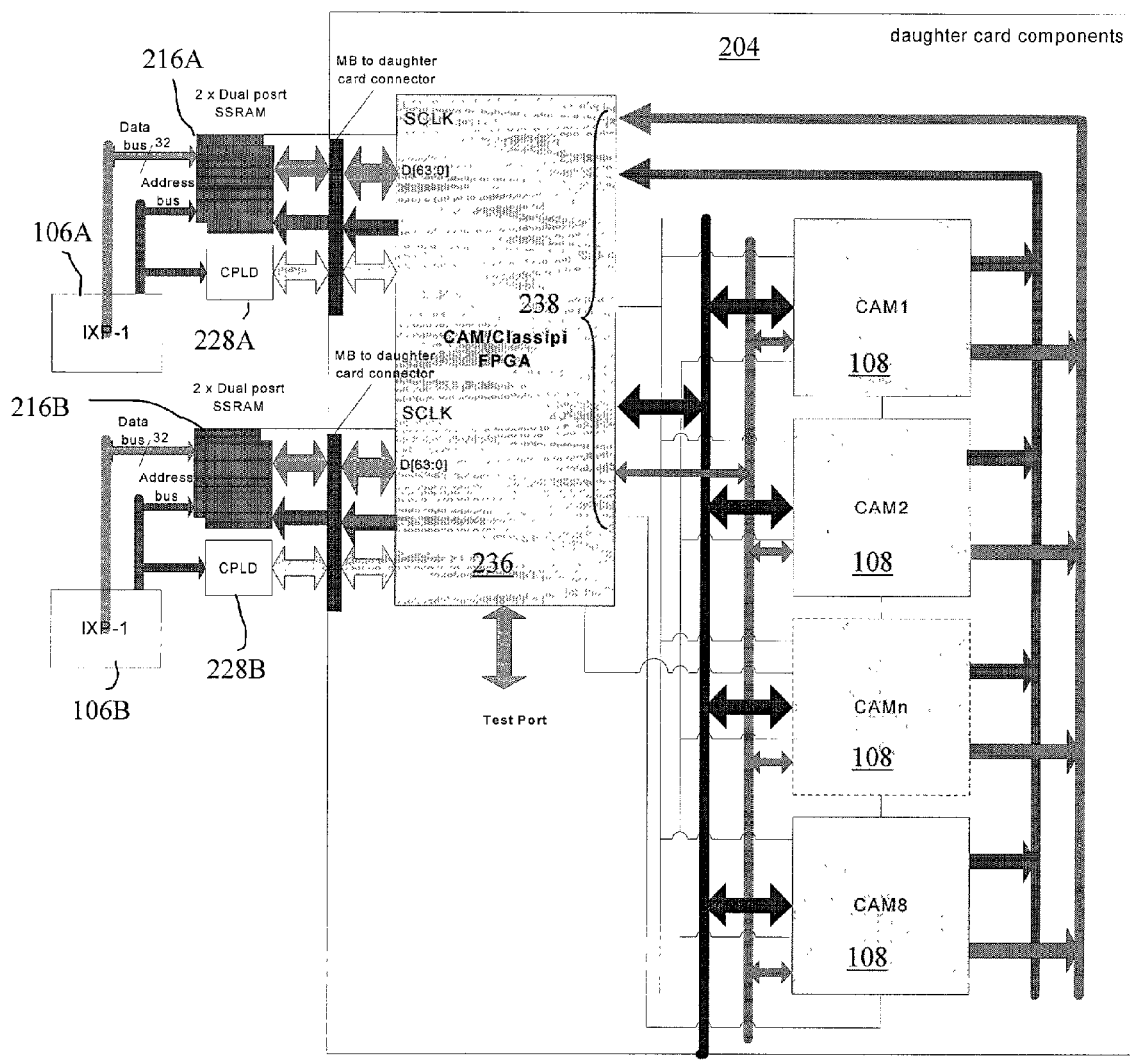
FIG. 8 depicts a more detailed schematic diagram of the main circuit board to daughter card connections for the primary processing element of FIG. 2.
Figure 9:
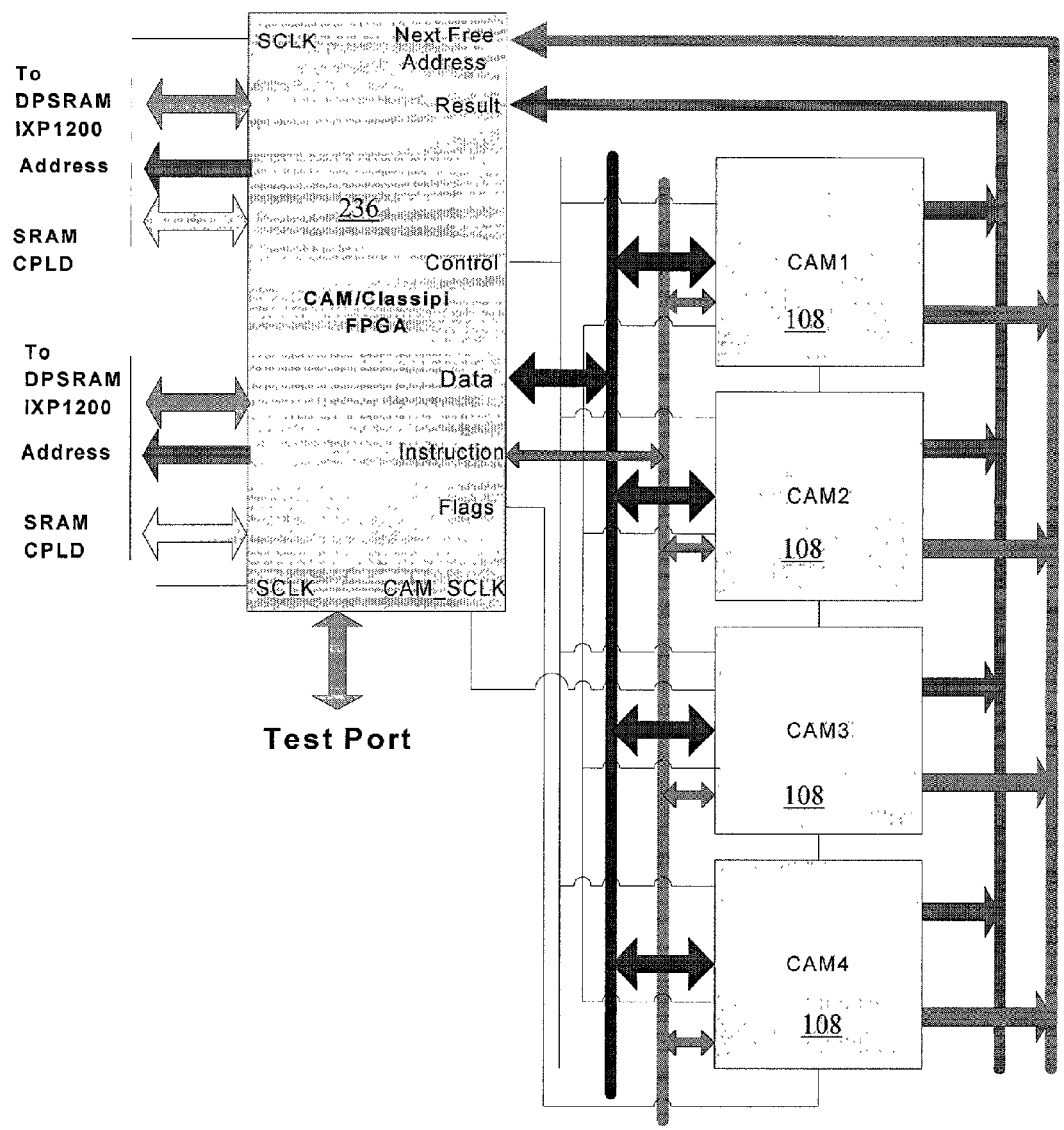
FIG. 9 depicts a more detailed schematic diagram of an exemplary daughter card for use with the primary processing element of FIG. 2.

FIG. 7 shows a more detailed diagram of the interfaces 212A, 212B, 214A, 214B, 232A, 232B to the DPSSRAM 216A, 216B and how the DPSSRAM memory devices are interleaved, described in more detail below. FIGS. 8 and 9 show more detailed schematic diagrams of the daughter card 204 and the interfaces to the daughter card control logic 236. FIGS. 8 and 9 further show the cascaded interconnections between the co-processors 108 and the daughter card control logic 236.

The CAM co-processors 108 provide a bi-directional 36/72 bit comparand bus ("cBus") for a 1 megabit part and a 72/144 bit bus for a 9 megabit part. This allows access to all of the internal registers and memory of the CAM co-processor 108. The CAM co-processors 108 further provide a 32 bit result bus ("rBus") which provides the result after completion of a compare operation. In addition, the CAM co-processors 108 provide a 16 bit instruction bus ("iBus") that allows instructions to be presented to the device once every cycle. Further, the CAM co-processors 108 provide an output only 24 bit Next Free Address ("NFA") bus that provides the next free address available. The flag I/O bits permit search depth cascading, as described above, without the need for glue logic.

Referring back to FIG. 2, the network processor 106A, 106B to co-processor 108 interface is separated by the DPSSRAM 216A, 216B. This minimizes bus loading and data traffic over the connectors between the main circuit board 202 and the daughter card 204 as well as simplifies the SRAM and daughter card control logic 228A, 228B, 236 and eliminates clock delays. The DPSSRAM 216A, 216B effectively acts as fast a bi-directional message passing buffer between the network processors 106A, 106B and the co-processors 108.

Dual ported memories, and in particular, DPSSRAM's, are designed to allow two separate and independent devices to access the memory at any given time, asynchronously. An exemplary use of dual ported memory is in computer video memory where the video data is written through one port by the computer and read out through the second port by video driver. The two interfaces of the DPSSRAM 216A, 216B are independently driven and isolated by the memory. The network processors 106A, 106B, therefore need only contend with making data read and write operations to the DPSSRAM 216A, 216B which makes co-processor 108 operations transparent to the network processors 106A, 106B and asynchronous to the system clock. Further, this design lowers complexity and development cycle risks.

Figure 10:
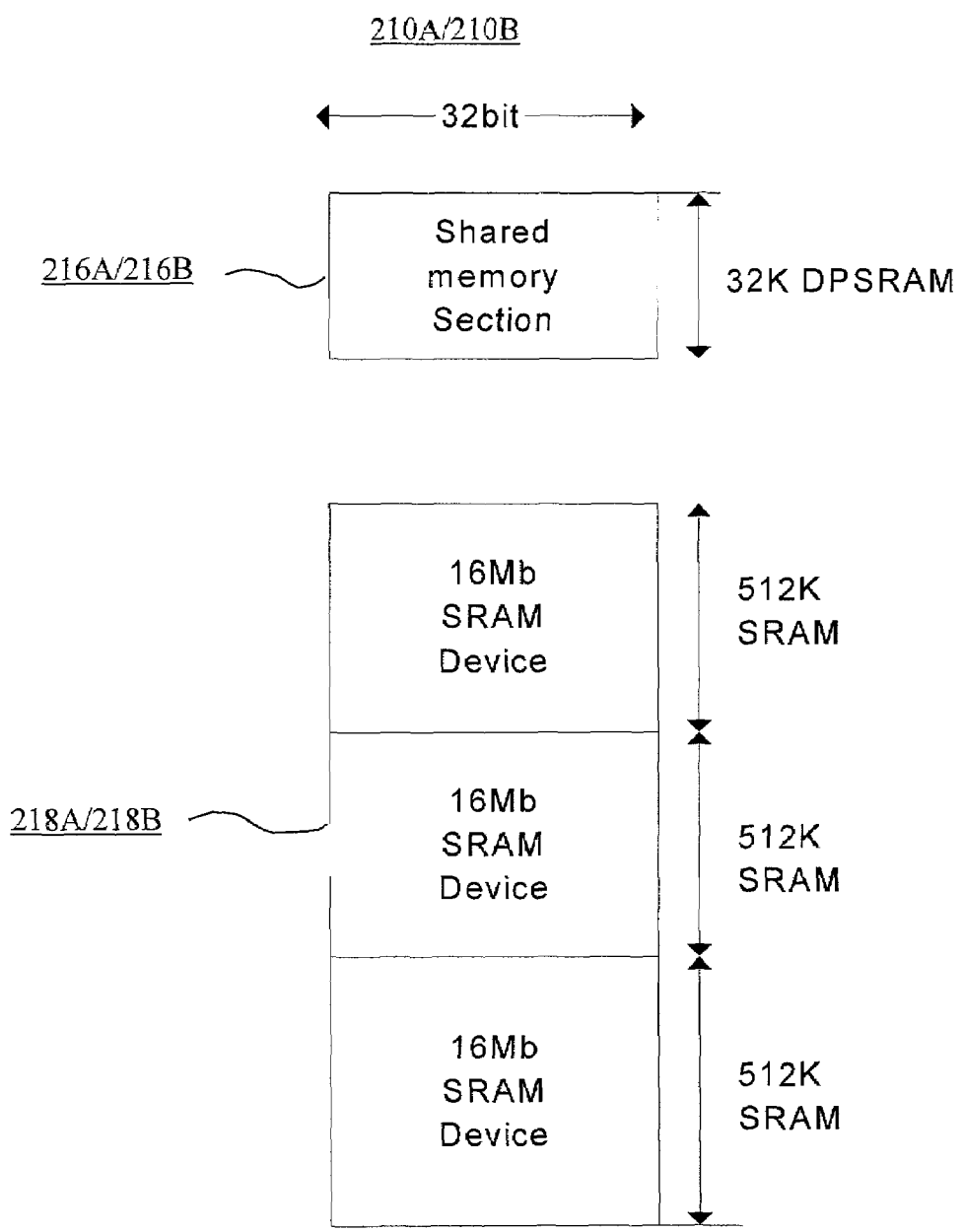
FIG. 10 depicts memory map for an S SRAM memory for use with the primary processing element of FIG. 2.

As described above, each SSRAM bank 210A, 210B includes a block of normal SSRAM 218A, 218B and a block of interleaved DPSSRAM 216A, 216B. The SSRAM bank 210A, 210B address space is arranged such that the DPSSRAM 216A, 216B devices occupy the upper portion of the address space. Referring to FIG. 10, in one embodiment, network processors 106A, 106B can address up to 8 megabytes of SSRAM memory. In this embodiment, the SSRAM bank 210A, 210B includes three 16 megabit (2 megabyte) SSRAM devices, each having a 32 bit×512 K row organization, and two 0.5 megabit DPSSRAM devices, each having a 36 bit×16 K row organization, occupying 32 kilo-double words of the remaining 2 megabyte address space. Further, the two DPSSRAM devices are interleaved on even and odd double word boundaries.

By interleaving the two DPSSRAM's, the network processors' 106A, 106B access to the memories can be operated at a nominal data rate and not effected by secondary bus speed. In this way, the network processors 106A, 106B can transfer their 32 bit data stream to the daughter card control logic 236 at a processing rate of at least 100 MHz. This further allows the bus that couples the secondary port of the DPSSRAM 216A, 216B with the connector 246 and the daughter card control logic 236 to run at half the data rate, e.g. 50 MHz or less with no degradation in the network processor 106A, 106B to SRAM interface 212A, 212B, 214A, 214B throughput, e.g. the network processors can still move a 32 bit transfer stream at normal rates to both the SSRAM block 218A, 218B and the DPSSRAM block 216A, 216B. It will be appreciated that the SSRAM bank 210A, 210B may include more or less memory and may utilize memory devices having alternate array organizations.

Figure 11:
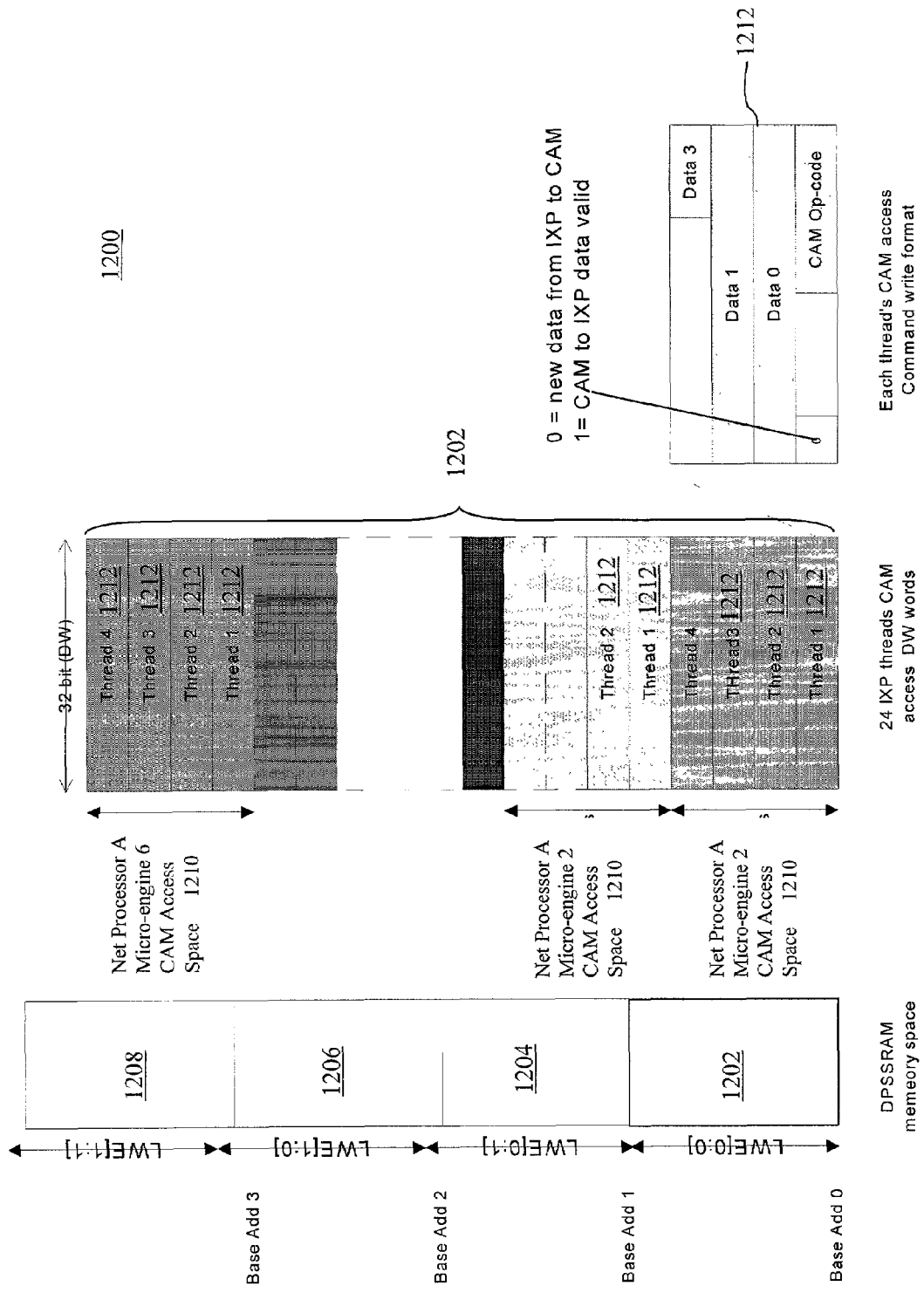
FIG. 11 depicts a more detailed memory map of the CAM DPSSRAM memory portion of the S SRAM memory map shown in FIG. 10.

The network processor 106A, 106B via the DPSSRAM 216A, 216B. FIG. 11 shows a memory map 1200 of the DPSSRAM 216A, 216B. Further, this Figure shows how the memory is mapped for communications between the network processors 106A, 106B and the CAM co-processors 108. It will be appreciated that the memory map (not shown) of the DPSSRAM 216A, 216B for access by the network processors 106A, 106B to the classification co-processors 108 is similar to the map shown in FIG. 11 for the CAM co-processors 108. The DPSSRAM 216A, 216B is divided into section 1202, 1204, 1206, 1208. These sections 1202, 1204, 1206, 1208 are used for facilitating communications between the network processors 106A, 106B and the CAM co-processors 108. In one embodiment, the CAM co-processor 108 memory sections 1202, 1204, 1206, 1208 are each 24 double words. It will be appreciated that the amount of memory, and structure of that memory is implementation dependent and that other organizations or different size memories may be used. The organization and function of these memory sections is described in more detail below.

The memory map 1200 details how the DPSSRAM memory 216A, 216B is utilized to transfer data between the network processor 106A, 106B and the CAM co-processors 108. The network processor 106A, 106B side of the DPSSRAM 216A, 216B is connected directly to the network processor 106A, 106B processor. The co-processor 108 side of the DPSSRAM 216A, 216B is connected to the daughter card control logic 236 that controls data transfers between the DPSSRAM 216A, 216B and the CAM co-processors 108.

The DPSSRAM 216A, 216B is divided into 4 segments 1202, 1204, 1206, 1208. Each segment 1202, 1204, 1206, 1208 is directly related to the CAM's 108 comparand word length of 36–288 bits long in increments of a quad-word to address bits 0–288 in steps. For example, using the exemplary network processor 106A, 106B which includes six micro-engines and four threads per engine, segment 0 1202 allows any of the six network processor 106A, 106B micro-engines and the associated 4 threads 1212 per micro-engine to access the CAM's 108 comparand word [0–71]. Thus, any writes to the segment 0 1202 transfers network processor's 106A, 106B data to the CAM's 108 register bits 0–71 data space by setting the CAM word control signals LWEN to 0 (LWEN[0:0]. Since the CAM supports a 36–78 bit bus, any writes beyond the 78 bits must be mapped by the control signals LWEN 2:0. Thus the network processor's 106A, 106B write operations to segment 0 1202 will only write the lower 72 bit word to the CAM with LWEN 2:0=00. The network processor's 106A, 106B write operations to segment 1 1204 will write the next upper data bits 72–144 in the CAM. Respectively the network processor's 106A, 106B write operations to the DPSSRAM segment 3 1208, will write to the most upper (MSB) bits 216–288 with the CAM control lines LWEN 2:0=11h. Segment 1 1204 transfers data between the network processor's 106A, 106B micro-engines and the CAM's 108 comparand data register bits [72:135] by setting the CAM word control signals to LWEN[0:1]. Segments 3 & 4 1206, 1208 transfer the network processor's 106A, 106B data to the CAM's 108 register bits 136–288, corresponding to LWEN [1:0] & LWEN [1:1] respectively.

Each segment 1202, 1204, 1206, 1208 is therefore subdivided into six access spaces 1210, one for each micro-engine of the network processor 106A, 106B. Further, each access space 1210 is sub-divided into four threads 1212 for each of the processing threads that the six micro-engines of the exemplary network processors 106A, 106B are capable of executing. This format allows very efficient Quad word data transfers between the respective processing threads of the network processor's 106A, 106B micro-engines and the CAM co-processors 108. The data transfers from the threads remain independent from each other for both read and writes. Write operations by network processors 106A, 106B occur simply by the thread of a micro-engine writing a data word to the appropriate segment of the DPSSRAM 216A, 216B corresponding to the word in the CAM's 108 0–288 bit registers. Read operations are similar to the writes but due to the pipeline between the two interleaved DPSSRAM devices and the CAM co-processor 108 through the control logic 236, the reads are delayed reads. The network processor 106A, 106B writes the read instruction as a double word or quad Word and some cycles later, on the order of 200–300 microseconds, it will read the result back from the DPSSRAM memory segment where the tread had written the read command.

Each quad data word area is used to support all the command variances as well for all data transfers. The lower double word from the network processor 106A, 106B to CAM co-processor 108 contains 16 bit CAM op-code together with several control bits that the daughter card control logic 236 uses to supply network processor 106A, 106B with CAM 108 results or the next free address ("NFA") in the CAM co-processor 108 table entry and respective flag status. FIG. 11 further shows this command format 1212. Exemplary CAM co-processor 108 instructions are detailed in Appendix A.

Figure 12:
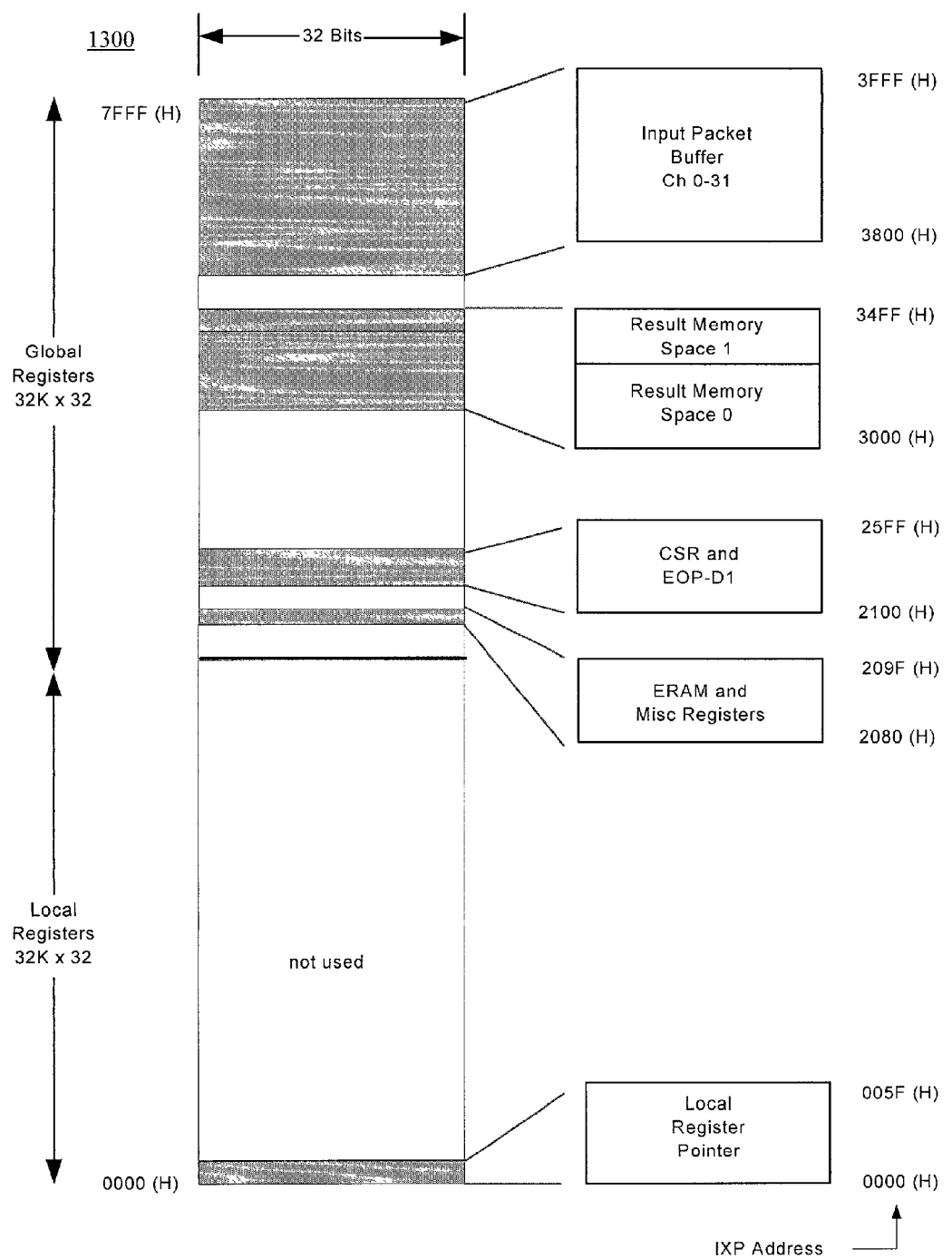
FIG. 12 depicts a more detailed memory map of the Classification Co-processor DPSSRAM memory portion of the SSRAM memory map shown in FIG. 10.

FIG. 12 shows a memory map 1300 of the network processor 106A, 106B to classification co-processors 108 data transfer section 1102 of the DPSSRAM 216A, 216B. The classification co-processors 108 support 32 independent processing channels allowing 32 independent contexts to use the classification co-processors 108 without the need of any semaphore protocol among the contexts. The first 16 channels are allocated to one network processor 106A, 106B and the other 16 channels are allowed to the other network processor 106A, 106B on the primary processing element 104A, 104B. By default, each channel can process packets with a maximum length of 256 bytes, however segments may be concatenated together to allow for longer packets.

Figure 13:
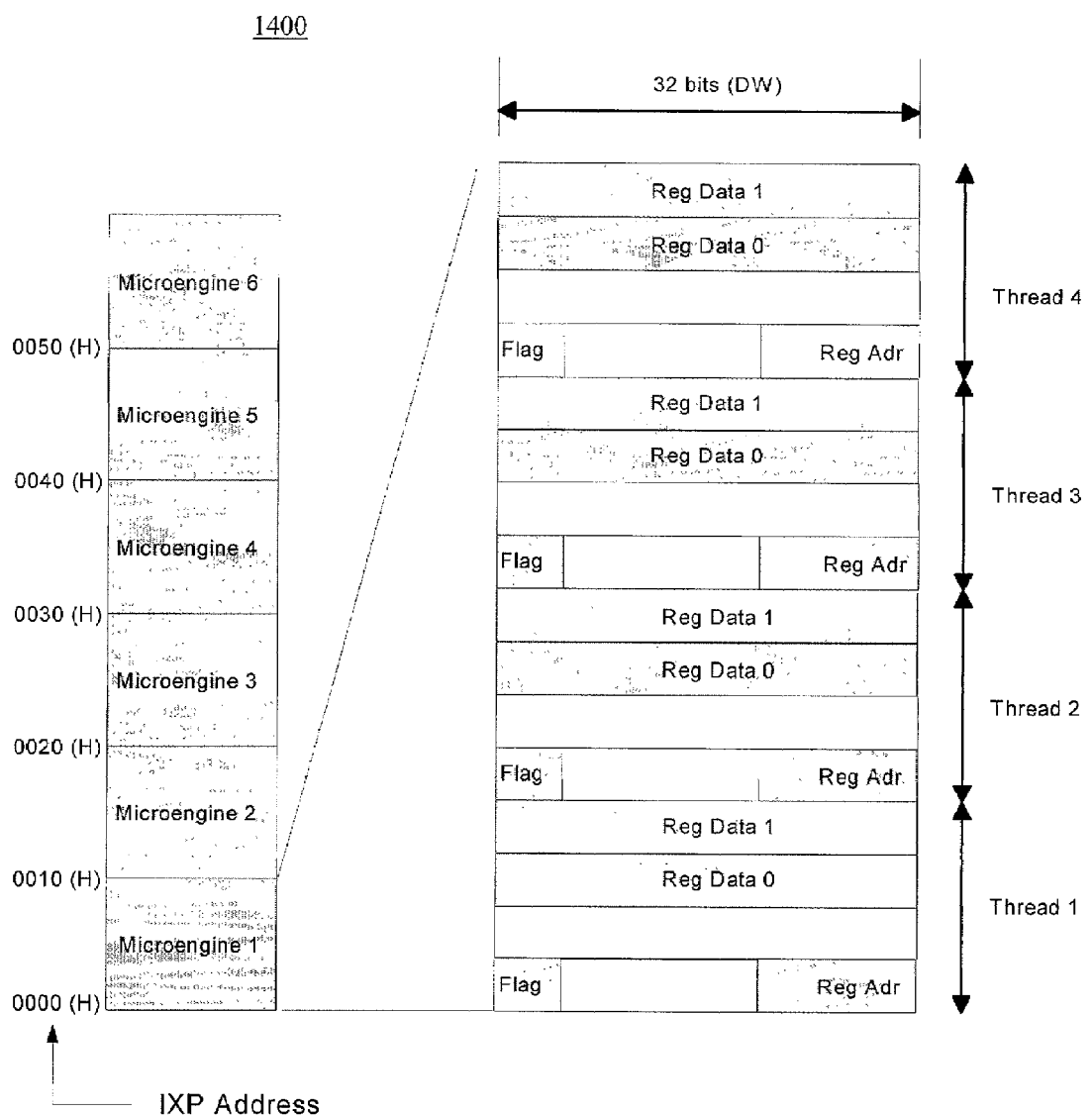
FIG. 13 depicts a more detailed memory map of the local register pointers as stored in the DPSSRAM memory portion of the SSRAM memory map shown in FIG. 10.

FIG. 13 shows a memory map 1400 for the local register pointers. Showing how the various micro-engines of the network processors 106A, 106B and the respective thread of the network processor 106A, 106B can cleanly access the classification co-processor 108 local registers with a command block structure of register address, command/data and semaphore flag to indicate direction of the data between the network processor 106A, 106B and the classification co-processor 108.

Figure 14:
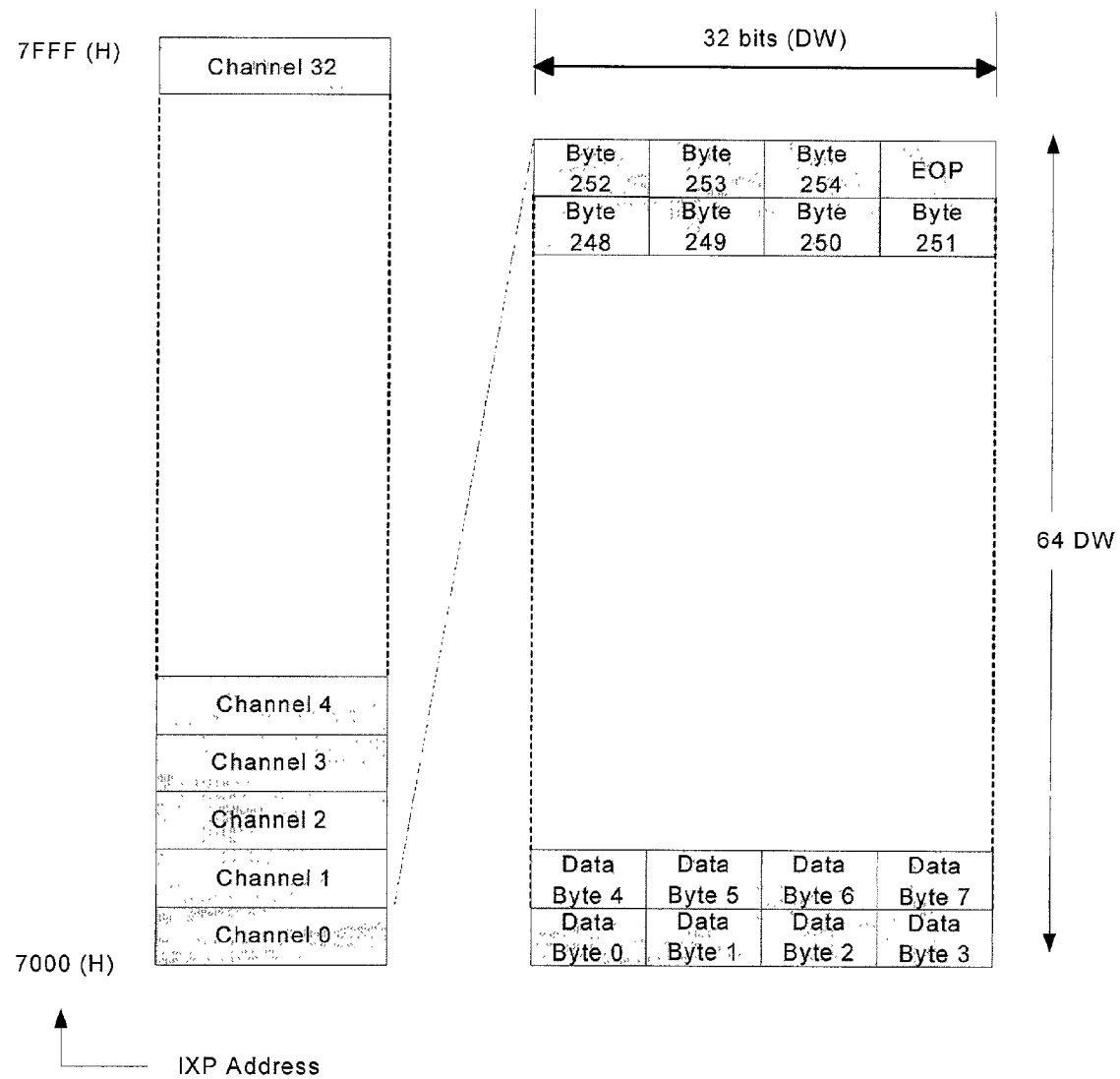
FIG. 14 depicts a more detailed memory map of the packet input registers as stored in the DPSSRAM memory portion of the SSRAM memory map shown in FIG. 10.

FIG. 14 shows a memory map 1500 for the packet input buffer of the co-processor 108 and the respective 32 channels that the network processor 106A, 106B can access via the DPSSRAM 216A, 216B mapped space. As explained above, the classification co-processor 108 supports local as well global registers and buffers. The DPSSRAM 216A, 216B the network processor 106A, 106B to address all the classification co-processor 108 resources as needed by each network processor 106A, 106B and the threads per processor. FIGS. 13 and 14 show the mapping of all the classification co-processor 108 resources available to the network processor 106A, 106B.

Typically the network processor 106A, 106B will configure the classification co-processor 108 at power up. Further set-up the rule memory through indirect address rule memory buffers in the classification co-processor 108. Once the classification co-processor 108 is configured and loaded with the search tree rules, the data to be processed is written to the classification co-processor 108 by the network processor 106A, 106B by loading each of the 32 channels of 108. Each channel can be up to 255 bytes with the 256 double words being the indication to start the computation. The classification co-processor 108 indicates the completion of the channel operation by the channel completion number and flags. At that point the result of the operation is available in the result memory space 0 and 1. One method for reading the result back by the network processor 106A, 106B is to react to the channel ready hard ware signs or interrupt from the classification co-processor 108. With the use of DPSSRAM 216A, 216B and the daughter card control logic 236, it becomes feasible to read the classification co-processor 108 results on completion and write then back to the respective channel mapped into the DPSSRAM 216A, 216B. The network processor 106A, 106B periodically will read the semaphore flag in the DPSSRAM 216A, 216B for the corresponding channel and if the direction flag is active, the network processor 106A, 106B can read the respective channel data back. The mechanism supported by the DPSSRAM 216A, 216B, SRAM control logic 228A, 228B, and the daughter card control logic 236 allows smooth operation with out network processor 106A, 106B having to wait on tasks pending. The architecture also allows multiple threads to operate independently in parallel thus improving the network processor 106A, 106B performance by many times than had it been connected directly to the classification co-processor 108.

One other issue with using the DPSSRAM 216A, 216B in this application is that the network processor 106A, 106B writes to memory is not reflected on the secondary side of the device. In other words, the co-processors 108 do not know when the network processor 106A, 106B writes data to the DPSSRAM 216A, 216B and vice versa. One alternative is to use semaphores, i.e. flags written to the DPSSRAM 216A, 216B which are continuously polled by the network processor 106A, 106B and the co-processors 108, for data transfers between the two sides of the memory. However, this is impractical here given that the network processor 106A, 106B has six micro-engines running up to four threads. This would require a high number of polling operations which would impact performance.

In one embodiment, on the network processor 106A, 106B side of the DPSSRAM 216A, 216B, custom SRAM control logic 228A, 228B is implemented using a field programmable gate array ("FPGA") that snoops on the network processor 106A, 106B address bus 214A, 214B for DPSSRAM 216A, 216B read/writes. The custom SRAM control logic 228A, 228B is also referred to as the Address Filter FPGA ("ADF FPGA"). On the daughter card 204, all of the co-processors 108 are coupled with the daughter card control logic 236 which mediates communications between the co-processors 108 and the DPSSRAM 216A, 216B, described in more detail below. The network processor 106A, 106B operations are reported to the daughter card control logic 236 by the SRAM control logic. By memory mapping the DPSSRAM 216A, 216B, as described above, in such way that network processor 106A, 106B writes to a particular segment of the memory triggers a known SRAM control logic 228A, 228B task, the data transfers between the network processor 106A, 106B and the co-processors 108 can be effected via the DPSSRAM 216A, 216B.

Alternatively, a first-in-first-out queue may be used that captures the network processor 106A, 106B transfers in the address pace of the DPSSRAM 216A, 216B. The daughter card control logic 236 can then retrieve the address from the FIFO queue and retrieve the respective data from the DPSSRAM 216A, 216B. Operation of the SRAM control logic 228A, 228B is similar to the FIFO, however the SRAM control logic 228A, 228B is able to do address decoding internally before signaling the daughter card control logic 236 on the daughter card 204.

Neither the SRAM control logic 228A, 228B nor the FIFO needs to be run at the half the core speed as either of the devices could be clocked on the quad word boundaries.

The DPSSRAM 216A, 216B is mapped such that the network processors 106A, 106B can address all of the co-processors 108 as though they were connected directly to its SRAM bus 212A, 212B, 214A, 214B. As mentioned earlier, the DPSSRAM 216A, 216B address on the both sides have no correlation to the operations occurring on either side. This imposes some changes in how the network processor 106A, 106B conducts read and write operations. Network processor 106A, 106B write operations happen immediately to the DPSSRAM 216A, 216B and therefore are considered normal write operations. However, read operations are delayed, as the data needs to be fetched from the desired co-processor 108 in question. This implies that the network processor 106A, 106B must initiate a dummy read and then wait for the daughter card control logic 236 to retrieve the data and write it to the DPSSRAM 216A, 216B some specified cycles later. The network processor 106A, 106B then reads the actual data from the desired location.

In actual fact, for the network processor 106A, 106B to read co-processor 108 data is not a problem. The co-processor expects a command even for data read. This implies that the network processor 106A, 106B must send (write) a command to the DPSSRAM 216A, 216B segment 802, 804, 806, 808. The daughter card control logic 236 retrieves the op-code written by the network processor 106A, 106B and decodes it to see if it is a write or read data operation being requested. The op-code most significant bits ("MSB") bits indicate the operation being requested. After decoding the op-code, the daughter card control logic issues the command to the co-processor 108. For a read command, it reads the data from the CAM co-processor 108 RBUS after compare command or data bus (CBUS) and delivers it to the DPSSRAM 216A, 216B segment 802, 804, 806, 808 where the command was issued from. To get the CAM co-processor's 108 next free address ("NFA") pointer result, a single bit token is exchanged from the segment 802, 804, 806, 808 between the network processor 106A, 106B and the daughter card control logic 236. The daughter card control logic 236 captures the appropriate NFA data together with the co-processor 108 flags and writes the data back at the DPSSRAM 216A, 216B. The network processor 106A, 106B polls the MSB, D[15] of the least significant double word and retrieves the data on the bit set active high.

The SRAM control logic 228A, 228B monitors the traffic over the network processor 106A, 106B SRAM Interface 212A, 212B, 214A, 214B to the DPSSRAM 216A, 216B and manages the data transfer to the daughter card control logic 236 on the daughter board 204.

As mentioned earlier, the DPSSRAM cannot convey the address between the two sides of the memory as they independently operate on the common storage cells. This design would have created problems as the daughter card control logic 236 managing the co-processors 108 needs to know when even the network processor 106A, 106B writes a command to the DPSSRAM 216A, 216B. The SRAM control logic 228A, 228B thus serves as the address decoder and informs the daughter card control logic 236 of any writes to the DPSSRAM 216A, 216B and the address to which the write occurred. This information is than used by the daughter card control logic 236 to prompt the appropriate one of the following actions:

Co-processor 108 maintenance (Read/write to control registers or read status);

Execute co-processor 108 operation on the data in DPSSRAM 216A, 216B. For example, execute a Compare operation in the CAM co-processor 108 or a classification operation in the classification co-processor 108;

Daughter card control logic 236 register update (FPA functionality); and

Transfer data to secondary network processor 106A, 106B via DPSSRAM's 216A, 216B. This implements direct memory access ("DMA") between the two DPSSRAM's 216A, 216B and the network processors 106A, 106B on the processing element 104.

The main function of the SRAM control logic 228A, 228B is to snoop the network processor SRAM address bus 214A, 214B together with the control signals and map the DPSSRAM 216A, 216B read/write operations into the top 32 K or 64 K portion of the 8 megabyte SRAM address spaces of the network processor 106A, 106B, as described above. In the case where the entire address space is implemented with normal SSRAM devices, the writes from the network processor 106A, 106B go to both the DPSSRAM 216A, 216B as well as the corresponding address within the 8 megabytes of main SSRAM. Alternatively, the network processor 106A, 106B can be loaded with 2, 4, or 6 megabytes of SSRAM in which case the DPSSRAM 216A, 216B occupies the top 32 k/64 K×32 bit of the top 2 megabytes of the SSRAM memory map.

The memory map shown in FIG. 11, assumes that only 6 megabytes of SSRAM are attached to each of the two network processors 106A, 106B and the DPSSRAM 216A, 216B is mapped into the top 2 megabytes of SSRAM space. If the 4th SSRAM was to be included, the read operations to the shared space of the main SSRAM can be avoided by controlling the output enable of the SSRAM devices which implement the top of the address space from the SRAM control logic 228A, 228B.

Each DPSSRAM 216A, 216B memory is mapped into the 8 megabyte SRAM address spaces of the corresponding network processors 106A, 106B on the processing element 104. DPSSRAM 216A, 216B are typically available in 16–256 K×32 bit capacity. The DPSSRAM 216A, 216B is further partitioned into blocks corresponding to the CAM or classification co-processors 108.

Figure 15:
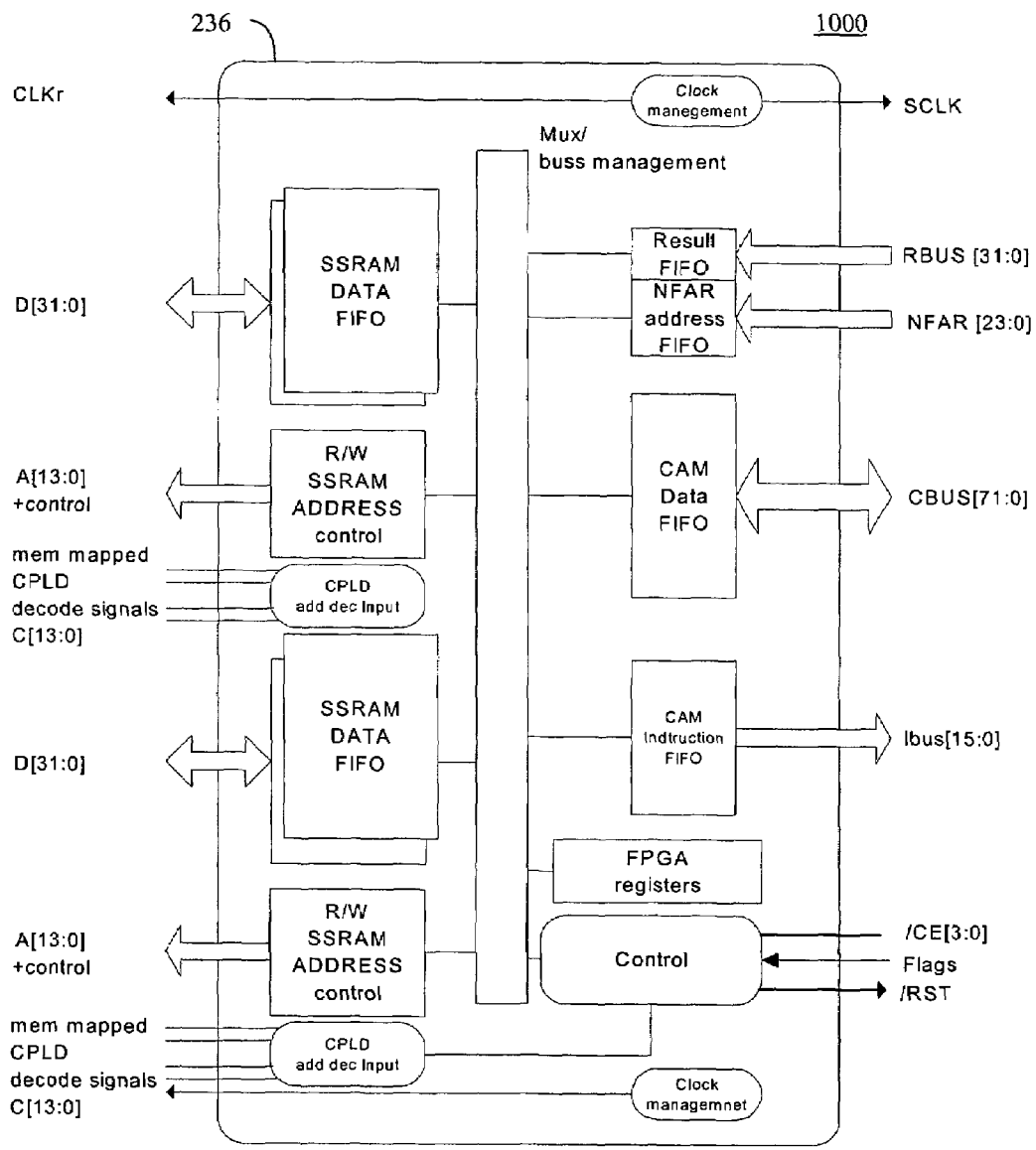
FIG. 15 depicts a block diagram of the daughter card control logic for use with the daughter card of FIG. 9.

FIG. 15 shows a block diagram 1000 of the daughter card control logic 236. It shows the command, data and bi-directional paths and the arbitration between the two network processors 106A, 106B to access the co-processors 108. As explained, the network processors 106A, 106B are coupled to one port of the DPSSRAM 216A, 216B via the SRAM memory data and address busses 212A, 214A. The SRAM control logic 228A, 228B snoops the SRAM memory address bus 214A via bus 230A and watches for co-processor 108 operations written by the network processors 106A, 106B. If a particular read/write operation is a co-processor 108 operation (determined by the address of the SSRAM memory falling within the co-processor 108 mapped address space), the SRAM control logic 228A, 228B informs the daughter card control logic 236. The daughter card control logic 236 reads the address of the DPSSRAM 216A, 216B that the network processor 106A, 106B had written the command to. The daughter card control logic 236 then reads the DPSSRAM 216A, 216B location using the address from the SRAM control logic 228A, 228B and loads it in internal buffers. The daughter card control logic then checks the type of operation and passes the command/data to the respective co-processor's 108 first-in-first-out ("FIFO") queue. On availability of the co-processor's 108 interface, the FIFO data and the commands are passed on together with the address to that co-processor 108. The co-processor uses the data to start the process and at a later time generates the result. Based on the result flags, the daughter card control logic 236 moves the data back to the DPSSRAM 216A, 216B of the appropriate network processor 106A, 106B and writes the result together with the semaphore flag indicating to the network processor 106A, 106B that the data is valid.

As mentioned above, the CAM co-processors 108 are capable of being cascaded together. For cascading anywhere from 2–8 CAM co-processors 108, the match I/O signals and all of the flag signals of each CAM co-processor 108 need to be connected from co-processor 108 to co-processor. The co-processor 108 which represents the least significant bits serves as inputs and the co-processor 108 which represents the most significant bits serves as the output to the daughter card control logic 236. The order of the CAM co-processors 108 must be configured via configuration registers within each CAM co-processor 108. For write operations to the appropriate CAM co-processor 108, the daughter card control logic 236 must enable the corresponding CAM co-processor 108 chip enable pin ("/CE").

FIG. 9 shows the block diagram of a portion of the daughter card control logic 236 interface related to interfacing with cascaded CAM co-processors 108. The data input of the daughter card control logic 236 is coupled with the DPSSRAM 216A, 216B and the control signal inputs are coupled with the SRAM control logic 228A, 228B on the main circuit board 202 of the processing element 104 via the connector 246.

The daughter card control logic 236 supports access by two network processors 106A, 106B, as described, to the common CAM co-processors 108 in the cascaded configuration. Since each micro engine works on the quad word boundaries, the data transfers from the DPSSRAM 216A, 216B to daughter card control logic 236 are quad word based data transfers. To further improve the network processor 106A, 106B micro-engines performance, the daughter card control logic 236 needs to provide a mechanism where by the data flow between the CAM co-processors 108 and the network processor 106A, 106B can be packed and unpacked. This is the area that the SRAM control logic 228A, 228B heavily assists in automating certain network processor 106A, 106B to CAM operations by allowing the network processor 106A, 106B to write to separate portions of the DPSSRAM 216A, 216B and informing the CAM FPGA of the data type.

It is therefore intended that the foregoing detailed description be regarded as illustrative rather than limiting, and that it be understood that it is the following claims, including all equivalents, that are intended to define the spirit and scope of this invention. For example, it will be appreciated that alternative interconnecting bus widths and operating frequencies may be used and are dependent upon the components used and the implementation of the design.

Appendix A
Exemplary Network Processor to CAM Instructions
1) Write Data Instructions
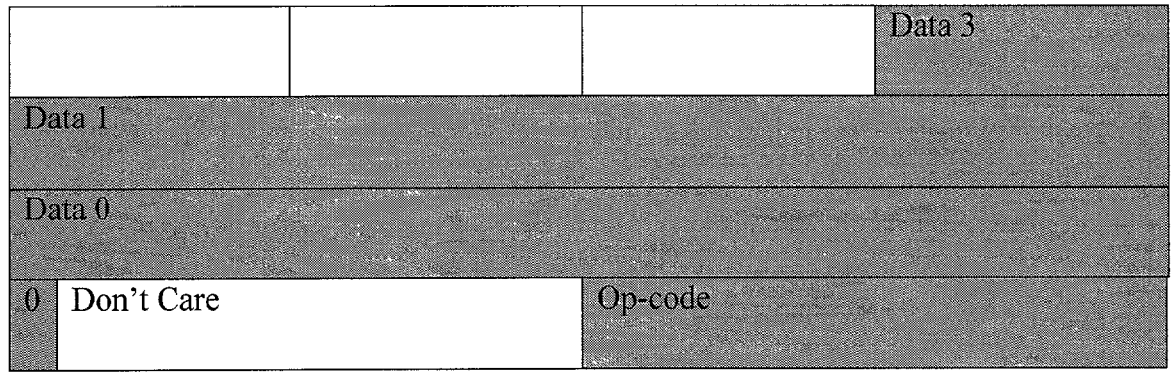

2) Compare Instructions:
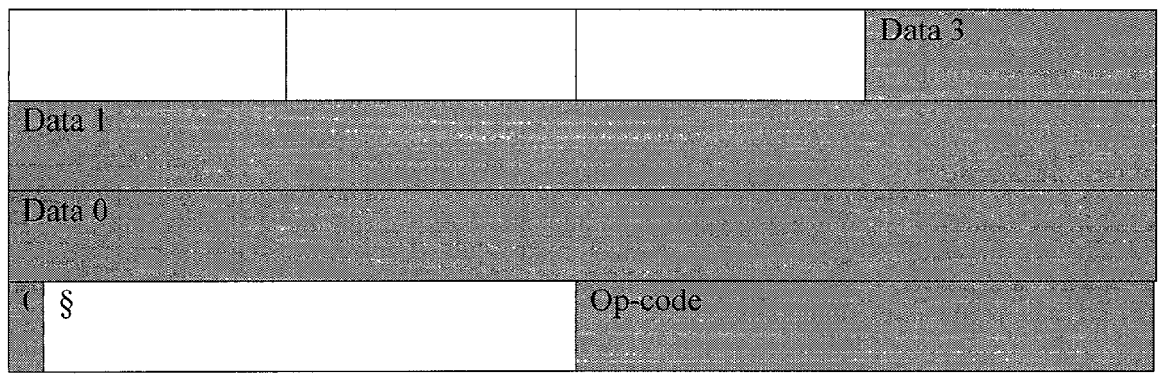

- NO NFA requested

| N/A | N/A | | |
|---|---|---|---|
| | | | |
| RESULT DW | | | |
| 1 | CAM Flags | N/A | |

- NFA requested

| N/A | N/A | N/A | N/A |
|---|---|---|---|
| | | | |
| RESULT DW | | | |
| 1 | CAM Flags | NFA | |

3) Special Instructions:

| | | | N/A |
|---|---|---|---|
| N/A | | | |
| Data 0 | | | |
| 0 | Don't Care | Op-code | |

4) Valid Bit Instruction

| | | | N/A |
|---|---|---|---|
| N/A | | | |
| N/A | | | |
| 0 | Don't Care | Op-code | |

Instructions supported:

| CBUS data | Op-code | Instruction description |
|---|---|---|
| N/A | | NOP |
| Data | | Write to device configuration register |
| Data | | Write to device ID register (Device ID input on CBUS [7:00]) |
| N/A | | Set full flag |
| Data | | Select single device mode (device ID on CBUS[7:0]) |
| N/A | | Select Global mode |
| N/A | | SW RESET – NOP cycle to follow |
| Data | | Write address counter (data input on CBUS) |

Note:

- All single cycle
- If operation is modify the VBIT (set VBIT), a NOP is needed if the next Instruction is to followed by read NFAC or write to next free address (NFA) register.
- NOP needed after "set empty all matching locations"

6) Local Mask Write Instruction

|  |  |  | Data 3 |
|---|---|---|---|
| Data 1 ||||
| Data 0 ||||
| 0 | Don't Care | Op-code ||

Instructions Supported:

| CBUS data | Op-code | Instruction description |
|---|---|---|
| Data |  | Write to local mask ward at address |
| Data |  | Write to local mask ward & inc Address counter |
| Data |  | Write to local mask ward at HPM |
| Data |  | Write to local mask word at NFA |

7) Read Operation

|  |  |  | Data 3 |
|---|---|---|---|
| Data 1 ||||
| Data 0 ||||
| 0 | Don't Care | Op-code ||

| N/A | N/A | N/A | Data 3 |
|---|---|---|---|
| Data 1 ||||
| Data 0 ||||
| 1 | N/A | N/A ||

We claim:

1. A packet processing system comprising:
   a processor;
   a co-processor separated from said processor by a boundary; and
   an interface coupled with said processor and said co-processor and operative to bridge said boundary, said interface including:
   a memory coupled with said processor and said co-processor, said memory having at least two read/write ports for reading and writing data to said memory wherein said processor is coupled with one of said at least two read/write ports and said co-processor is coupled with the other of said at least two read/write ports; and
   control logic coupled with said at least two read/write ports;
   wherein said processor stores data intended for said co-processor to said memory and reads data stored by said co-processor from said memory;
   said co-processor stores data intended for said processor to said memory and reads data stored by said processor from said memory; and
   said control logic operative to facilitate the reading of said stored data by said processor and said co-processor by detecting a store operation by said co-processor of data, intended for said processor, to said memory and, based thereon signaling said processor of the detected store operation and by detecting a store operation by said processor of data, intended for said co-processor, to said memory and, based thereon, signaling said co-processor of the detected store operation, said processor and co-processor not otherwise signaling said control logic of said store operations; and
   wherein said processor and said co-processor are capable of storing data to said memory substantially simultaneously.

2. The packet processing system of claim 1, wherein said boundary comprises a printed circuit board-to-printed circuit board connector coupled between said processor and said co-processor.

3. The packet processing system of claim 1, wherein said processor communicates with a first protocol and said co-processor communicates with a second protocol, said boundary comprising a difference between said first and second protocols, said interface being further operative to translate data between said first and second protocols.

4. The packet processing system of claim 1, wherein said processor is a network processor.

5. The packet processing system of claim 1, wherein said co-processor is a task specific processor.

6. The packet processing system of claim 5, wherein said co-processor is a content addressable memory.

7. The packet processing system of claim 5, wherein said co-processor is a classification processor.

8. The packet processing system of claim 1, wherein said control logic detects when said processor has stored data to said memory by snooping a memory address associated with said stored data.

9. The packet processing system of claim 1, wherein said control logic signals said co-processor when said processor has written data to said memory.

10. The packet processing system of claim 1, wherein said memory comprises a dual ported sync-burst static random access memory.

11. An interface for coupling a processor to a co-processor across a boundary, said processor and said co-processor being separated by said boundary, said interface comprising:
    a memory coupled with said processor and said co-processor, said memory having at least two read/write ports for reading and writing data to said memory wherein said processor is coupled with one of said at least two read/write ports and said co-processor is coupled with the other of said at least two read/write ports; and
    control logic coupled with said at least two read/write ports;
    wherein said processor stores data intended for said co-processor to said memory and reads data stored by said co-processor from said memory;
    said co-processor stores data intended for said processor to said memory and reads data stored by said processor from said memory; and
    said control logic operative to facilitate the reading of said stored data by said processor and said co-processor by detecting a store operation by said co-processor of data, intended for said processor, to said memory and, and based thereon, signaling said processor of the detected store operation and by detecting a store operation by said processor of data, intended for said processor, to said memory and signaling said co-processor of the detected store, said processor and co-processor not otherwise signaling said control logic of said store operation; and
    wherein said processor and said co-processor are capable of storing data to said memory substantially simultaneously.

12. The interface of claim 11, wherein said boundary comprises a printed circuit board-to-printed circuit board connector coupled between said processor and said co-processor.

13. The interface of claim 11, wherein said processor communicates with a first protocol and said co-processor communicates with a second protocol, said boundary comprising a difference between said first and second protocols.

14. The interface of claim 11, wherein said processor is a network processor.

15. The interface of claim 11, wherein said co-processor is a task specific processor.

16. The interface of claim 15, wherein said co-processor is a content addressable memory.

17. The interface of claim 15, wherein said co-processor is a classification processor.

18. The interface of claim 11, wherein said control logic detects when said co-processor has stored data said memory by snooping a memory address associated with said stored data.

19. The interface of claim 11, wherein said control logic signals said co-processor when said processor has written data to said memory.

20. The interface of claim 11, wherein said memory comprises a dual ported sync-burst static random access memory.

21. The interface of claim 11, wherein said interface allows said processor to communicate with said co-processor as if said co-processor was directly connected with said processor.

22. The interface of claim 11, wherein said interface allows said processor to operate independently of the interface requirements of said co-processor.

23. The interface of claim 11, wherein said processor is located on a first circuit board and said co-processor is located on a second circuit board coupled with said first circuit board by a first connector, said first connector characterized by at least one electrical characteristic, said interface operative to isolate said processor and said co-processor from said at least one electrical characteristic.

24. A method of interfacing a processor with a co-processor across a boundary, said processor and said co-processor being separated by said boundary, said method comprising:
 (a) receiving first data from said processor via a first interface;
 (b) storing said first data in a memory;
 (c) detecting, by control logic, that said first data is intended for said co-processor, said processor not otherwise signaling said control logic of said storing;
 (d) signaling, by said control logic, said co-processor that said first data has been stored;
 (e) receiving a read command from said co-processor via a second interface; and
 (f) providing said first data to said co-processor via said second interface across said boundary;
 wherein said processor and said co-processor are capable of storing data to said memory substantially simultaneously.

25. The method of claim 24, further comprising:
 (f) receiving second data from said co-processor via said second interface;
 (g) storing said second data in said memory;
 (h) signaling said processor that said second data has been stored;
 (i) receiving a read command from said processor via said first interface; and
 (j) providing said second data to said processor via said first interface across said boundary.

26. The method of claim 24, wherein said providing further comprises providing said first data across a boundary comprising a printed circuit board-to-printed circuit board connector.

27. The method of claim 24, said method further comprising using a network processor as said processor.

28. The method of claim 24, said method comprising using a task specific processor as said co-processor.

29. The method of claim 28, wherein said co-processor is a content addressable memory.

30. The method of claim 28, wherein said co-processor is a classification processor.

31. The method of claim 24, wherein said detecting includes snooping an address associated with said first data.

32. The method of claim 24, wherein said memory comprises a dual ported sync-burst static random access memory.

33. The method of claim 24, wherein said processor communicates with said co-processor as if said co-processor was directly connected with said processor.

34. An apparatus for facilitating communications between a first processor and a second processor, the apparatus comprising:
 a dual port memory coupled with said first processor via first interface and said second processors via a second interface, and operative to act as a message buffer between said first processor and said second processor; and
 control logic coupled with said dual ported memory and operative to detect a data store operation by one of said first and second processors of data intended for the other of said first and second processors, and said control logic further operative to inform the other of said first and second processors of said data store operation, said first and second processors not otherwise signaling said control logic of said data store operation;
 wherein first said processor and said second processor are capable of storing data to said memory substantially simultaneously.

35. The apparatus of claim 34, wherein said first processor comprises a network processor.

36. The apparatus of claim 34, wherein said second processor comprises a task specific processor.

37. The apparatus of claim 36, wherein said second processor comprises a content addressable memory.

38. The apparatus of claim 36, wherein said second processor comprises a classification processor.

39. The apparatus of claim 34, wherein said control logic signals said first processor when said second processor has written data to said dual ported memory and said control logic signals said second processor when said first processor has written data to said dual ported memory.

40. The apparatus of claim 34, wherein said dual ported memory comprises a dual ported sync-burst static random access memory.

41. The apparatus of claim 34, wherein said first processor communicates with said second processor as if said second processor was directly connected with said first processor.

42. The apparatus of claim 34, wherein said control logic detects communications by snooping a memory address associated with the communications.

* * * * *